(12) United States Patent
Niinuma et al.

(10) Patent No.: US 8,270,726 B2
(45) Date of Patent: Sep. 18, 2012

(54) AUTHENTICATION APPARATUS

(75) Inventors: Koichiro Niinuma, Kawasaki (JP); Yukihiro Abiko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 709 days.

(21) Appl. No.: 12/402,803

(22) Filed: Mar. 12, 2009

(65) Prior Publication Data

US 2009/0232368 A1  Sep. 17, 2009

(30) Foreign Application Priority Data

Mar. 13, 2008 (JP) ................................ 2008-063546

(51) Int. Cl.
*G06K 9/48* (2006.01)
(52) U.S. Cl. ....................................................... 382/199
(58) Field of Classification Search .................. 382/199, 382/115–127
See application file for complete search history.

(56) References Cited

U.S. PATENT DOCUMENTS

| | | | |
|---|---|---|---|
| 5,990,804 A | 11/1999 | Koyama | |
| 7,151,846 B1 | 12/2006 | Fujii | |
| 2007/0014443 A1 | 1/2007 | Russo | |
| 2007/0215558 A1 | 9/2007 | Niinuma et al. | |

FOREIGN PATENT DOCUMENTS

| | | |
|---|---|---|
| EP | 1 835 437 A1 | 9/2007 |
| JP | 10-165382 A | 6/1998 |
| JP | 10-302047 A | 11/1998 |
| JP | 2001-118065 A | 4/2001 |
| JP | 2005-143804 A | 6/2005 |
| JP | 2007-244712 A | 9/2007 |

OTHER PUBLICATIONS

European Seacrh Reoport dated Nov. 15, 2010, issued in corresponding European Patent Application No. 09155081.4.
Elliott, Stephen J. et al.; "Image Quality and Minutiae Count Comparison for Genuine and Artificial Fingerprints"; Security Technology, 2007 41st Annual IEEE International Carnahan Conference on , IEEE, PI, Oct. 1, 2007, pp. 30-36, XP031155240.
Matsumoto, Tsutomu et al: "Impact of Artificial "Gummy Fingers" on Fingerprint Systems"; Proceedings of the International Society for Optical Engineering (SPIE), SPIE, USA LNKD-DOI: 10.1117/12. 462719, vol. 4677, Jan. 1, 2002, pp. 275-289, XP009002513.
Maltoni, D. et al; "9.5. Liveness Detection Techniques"; Handbook of Fingerprint Recognition; Jan. 1, 2009, Springer, pp. 386-391, XP002607754.

*Primary Examiner* — Chan S Park
*Assistant Examiner* — Elisa Rice
(74) *Attorney, Agent, or Firm* — Westerman, Hattori, Daniels & Adrian, LLP

(57) ABSTRACT

An authentication apparatus is provided. A forgery determination threshold is determined on the basis of two types of parameters, a forgery similarity and a forgery difficulty. If a calculated value for an object under test is lower than or equal to the forgery determination threshold, then, it is determined that the object is a biologic object. Thus, easiness in impersonation with a fake of a biologic object that is easy to forge may be reduced, and a false rejection due to a determination in which a biologic object is erroneously determined as a fake may be reduced.

18 Claims, 31 Drawing Sheets

| Vo/Vi | FORGERY SCORE | FORGERY SIMILARITY |
|---|---|---|
| 0.8 – 1.0 | 0.0 – 0.2 | 1 |
| 0.7 – 0.8 | 0.2 – 0.3 | 2 |
| 0.6 – 0.7 | 0.3 – 0.4 | 3 |
| 0.5 – 0.6 | 0.4 – 0.5 | 4 |
| 0.4 – 0.5 | 0.5 – 0.6 | 5 |
| 0.3 – 0.4 | 0.6 – 0.7 | 6 |
| 0.2 – 0.3 | 0.7 – 0.8 | 7 |
| 0.0 – 0.2 | 0.8 – 1.0 | 8 |

Fig. 5

| MATCHING SCORE | FORGERY DIFFICULTY |
|---|---|
| 90 – 100 | 10 |
| 80 – 89 | 9 |
| 70 – 79 | 8 |
| 60 – 69 | 7 |
| 50 – 59 | 6 |
| 40 – 49 | 5 |
| 30 – 39 | 4 |
| 20 – 29 | 3 |
| 10 – 19 | 2 |
| 0 – 9 | 1 |

Fig. 7

| FORGERY DIFFICULTY | FORGERY DETERMINATION THRESHOLD |
|---|---|
| 10 | 0.0 |
| 9 | 0.1 |
| 8 | 0.2 |
| 7 | 0.3 |
| 6 | 0.4 |
| 5 | 0.5 |
| 4 | 0.6 |
| 3 | 0.7 |
| 2 | 0.8 |
| 1 | 0.9 |

Fig. 17

AUTHENTICATION APPARATUS

FIELD

The embodiments disclosed herein are related to an authentication apparatus using biometric data such as fingerprints in authentication. More particularly, the embodiments are related to an authentication apparatus capable of reducing false acceptance due to a fake such as a gummy finger.

BACKGROUND

For person authentication, conventionally, password authentication and identification (ID) card authentication have been widely used. However, such authentication using non-biometric data has a high risk of fraudulent use. From this viewpoint, as more reliable person authentication, authentication using biometric data (biometric authentication) such as fingerprint authentication has attracted attention and tends to be used.

However, in the biometric authentication, a problem of false acceptance due to a fake imitating a biologic object has been pointed out. In the fingerprint authentication, for example, it is pointed out that many fingerprint sensors determine a gummy finger, a fake finger made of gelatin, as a live finger.

To prevent such abuse using fake fingerprints, a technology is known to generate an oscillation frequency corresponding to an electrostatic capacity of an object under test, e.g. a live finger, to detect whether the object under test is a biologic object or not by comparing the oscillation frequency to a reference signal, as disclosed in Japanese Laid-open Patent Publication No. 10-165382, for example.

Further, another technology is known to apply two square-wave input voltages having different frequencies to an object under test and calculating an impedance of the object under test on the basis of the output voltage to determine that the object under test is a live finger in accordance with whether the impedance is within an impedance range of live fingers, as disclosed in Japanese Laid-open Patent Publication No. 2005-143804, for example.

Further, to deal with a case where a live finger is not determined as a live finger because a measured value of the live finger is lower than a biologic object determination reference value, another technology is known to determine whether a live finger or a fake finger by changing a biologic object determination reference level depending on the state of each biologic object and the biologic object detection function, as disclosed in Japanese Laid-open Patent Publication No. 10-302047, for example.

In determination whether a live finger or a fake finger, technologies based on an electrostatic capacity of a live finger (e.g. Japanese Laid-open Patent Publication No. 10-165382) or technologies based on an impedance of a live finger (e.g. Japanese Laid-open Patent Publication No. 2005-143804) have inconvenience that a biologic object having a characteristic similar to a fake finger may be erroneously determined as a fake finger.

On the other hand, setting a threshold for determining whether a live finger or a fake finger to a small value under a condition where it is highly possible that a live finger is determined as a fake finger (e.g. Japanese Laid-open Patent Publication No. 10-302047) make a live finger not to be determined as a fake finger but make a fake finger to be easily authenticated, which causes a problem in security.

Some biologic objects have similar characteristics as the fakes. In such a case, forgery similarities are high. Accordingly, impersonation with a fake for a biologic object easy to forge may be easy when forgery determination thresholds are uniformly lowered.

As an example of a fake, there is a gummy finger made of gelatin. To determine whether a gummy finger or a biologic object, there is a method based on impedance. In the method based on impedance, a range of impedance of live fingers (or fake fingers) is recorded in advance. Whether a live finger or a fake finger is determined in accordance with whether input impedance of the object under test is within the range. Impedance of a biologic object differs depending on a state of the finger skin such as dry, wet, or the like. A gummy finger has different impedance depending on production methods or the like. Accordingly, some live fingers (wet fingers, etc.) have impedance characteristics similar to some of gummy fingers. For live fingers that have impedance characteristics similar to such gummy fingers, if the impedance range is set such that the live fingers are not erroneously determined as fake fingers (gummy fingers), it is difficult to prevent false acceptance by the gummy fingers. Further, there is a problem that live fingers having similar impedance characteristics as gummy fingers may be erroneously determined as fake fingers.

SUMMARY

According to an aspect of the present invention, provided is an authentication apparatus for authenticating a person by determining whether input data belongs to a biologic object in accordance with a predefined condition based on biometric data of a genuine person and whether the input data matches with registered biometric data of the genuine person. The authentication apparatus includes a forgery data extractor, a forgery similarity calculator, a forgery difficulty calculator, a determination threshold setter, a forgery score calculator, and a forgery determiner. The forgery data extractor extracts forgery data from the input data. The forgery data is for determining whether the input data belongs to a biologic object or a fake. The forgery similarity calculator calculates forgery similarity of biometric data of the genuine person. The forgery similarity indicates similarity to a fake. The forgery difficulty calculator calculates forgery difficulty of biometric data of the genuine person. The forgery difficulty indicates difficulty of forgery. The determination threshold setter determines a forgery determination threshold on the basis of the forgery similarity and the forgery difficulty. The forgery score calculator calculates a forgery score of the input data on the basis of extracted forgery data. The forgery score indicates likelihood of forgery. The forgery determiner determines whether the input data belongs to a biologic object by comparing calculated forgery score with the forgery determination threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a diagram illustrating a forgery similarity conversion table according to the first embodiment of the present invention;

FIG. 7 is a diagram illustrating a forgery difficulty conversion table according to the first embodiment of the present invention;

FIG. 17 is a diagram illustrating a forgery determination threshold conversion table according to the first embodiment of the present invention;

DESCRIPTION OF EMBODIMENTS

Figure 1:
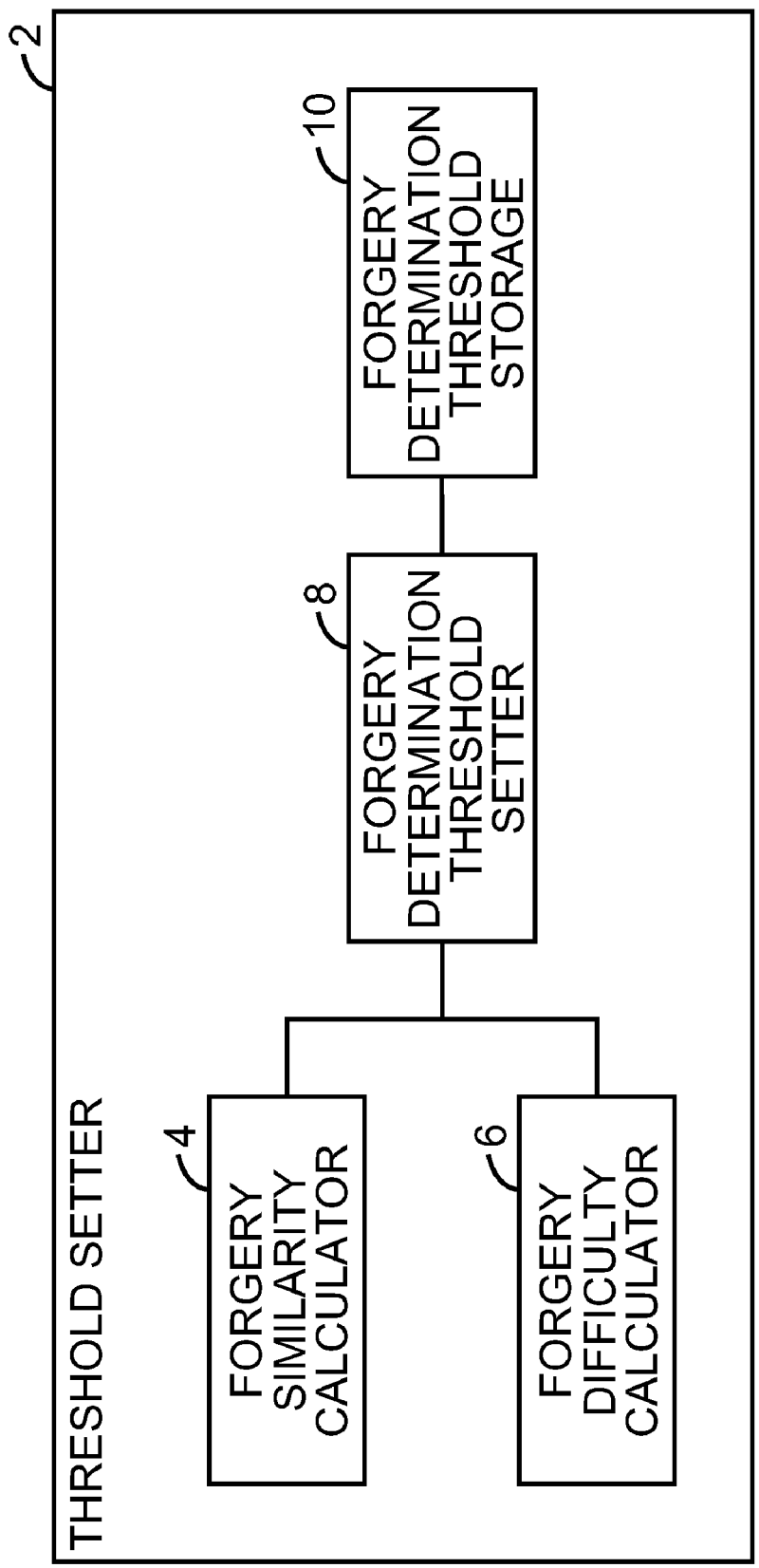
FIG. 1 is a block diagram illustrating a threshold setter according to a first embodiment of the present invention.

FIG. 1 is a block diagram illustrating a threshold setter according to a first embodiment of the present invention.

The threshold setter 2 illustrated in FIG. 1 sets a determination threshold used to determine whether authentication data is biometric data or not. The threshold setter 2 is used for authentication in an authentication apparatus that uses biometric data such as fingerprint data obtained from a biologic object.

As illustrated in FIG. 1, the threshold setter 2 includes a forgery similarity calculator 4, a forgery difficulty calculator 6, a forgery determination threshold setter 8, and a forgery determination threshold storage 10. The threshold setter 2 sets a forgery determination threshold as a threshold used to reduce a determination that a fake (for example, a gummy finger) is erroneously determined as a biologic object.

The forgery similarity calculator 4 calculates a forgery similarity. The "forgery similarity" is an index of easiness in erroneously determining that input data belongs to a fake (for example, a gummy finger). The forgery similarity is calculated, for example, using a forgery score obtained from biometric data input at the time of registration, a forgery score obtained from input data input at the time of matching in the past, or the like. The forgery score indicates a likelihood of forgery in the input data. A method using the forgery score to determine whether a biologic object or not is disclosed, for example, in Japanese Laid-open Patent Publication No. 2007-244712.

The forgery difficulty calculator 6 calculates a forgery difficulty. The "forgery difficulty" is an index of a difficulty in impersonation with a fake (for example, a gummy finger) with respect to biometric data. The forgery difficulty is calculated, for example, using a matching score, a matching determination threshold, a state of a biologic object, or the like at the previous matching. The matching score indicates a similarity between biometric data (registered biometric data) which has been registered and input data which has been input for authentication.

When the matching score is higher than or equal to the matching determination threshold, it is determined that the input data and the registered biometric data are substantially the same. A determination method using the matching score is disclosed, for example, in Japanese Laid-open Patent Publication No. 2001-118065. Further, as the above-mentioned "state of a biologic object", for example, in a fingerprint authentication, unsharpness of fingerprint ridges, dryness, or the like may be used.

The forgery determination threshold setter 8 calculates and setting a forgery determination threshold. In the first embodiment, the forgery determination threshold setter 8 calculates and sets the forgery determination threshold using a forgery similarity calculated in the forgery similarity calculator 4 and a forgery difficulty calculated in the forgery difficulty calculator 6.

The forgery determination threshold storage 10 stores and registers a forgery determination threshold. The forgery determination threshold calculated and set in the forgery determination threshold setter 8 is stored in the forgery determination threshold storage 10.

Figure 2:
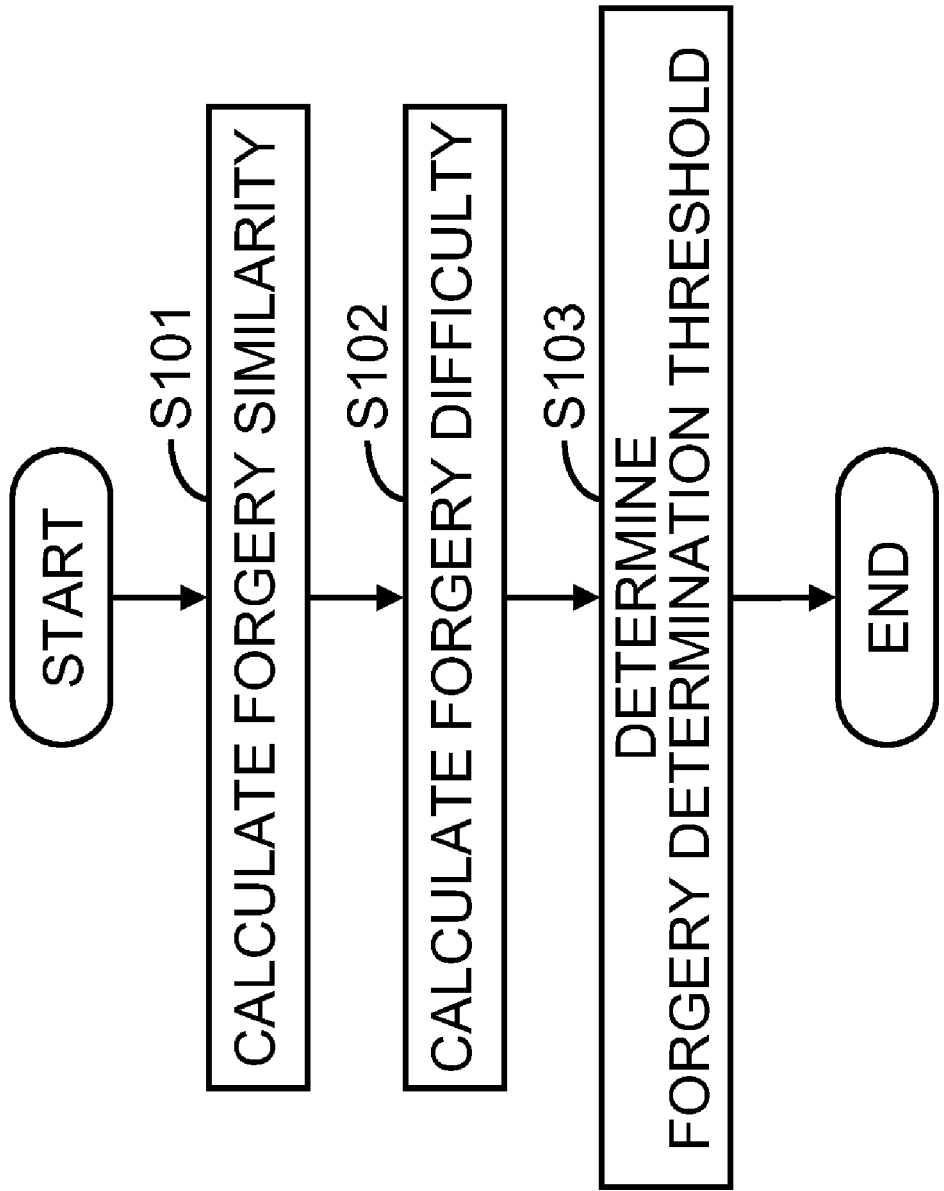
FIG. 2 is a flowchart illustrating a flow of a process for setting a forgery determination threshold according to the first embodiment of the present invention.

FIG. 2 is a flowchart illustrating a flow of a process for setting a forgery determination threshold according to the first embodiment of the present invention. The process illustrated in FIG. 2 is an example, and the present invention is not limited to the process illustrated therein.

The process illustrated in FIG. 2 is an example of using the above-mentioned forgery similarity calculator 4 and the forgery difficulty calculator 6 in an authentication method. To set a forgery determination threshold, as disclosed above, biometric data is used.

In operation S101, input data is input to the forgery similarity calculator 4, and the forgery similarity calculator 4 calculates a forgery similarity on the basis of the input data.

In operation S102, after the calculation of the forgery similarity, input data of substantially the same part of the same person is input to the forgery difficulty calculator 6, and the forgery difficulty calculator 6 calculates a forgery difficulty on the basis of the input data. The calculation of the forgery similarity and the calculation of the forgery difficulty may be performed in reverse or at substantially the same time.

In operation S103, on the basis of the forgery similarity and the forgery difficulty, the forgery determination threshold setter 8 determines a forgery determination threshold, and stores the forgery determination threshold in the forgery determination threshold storage 10. Then, the process is finished.

Figure 3:
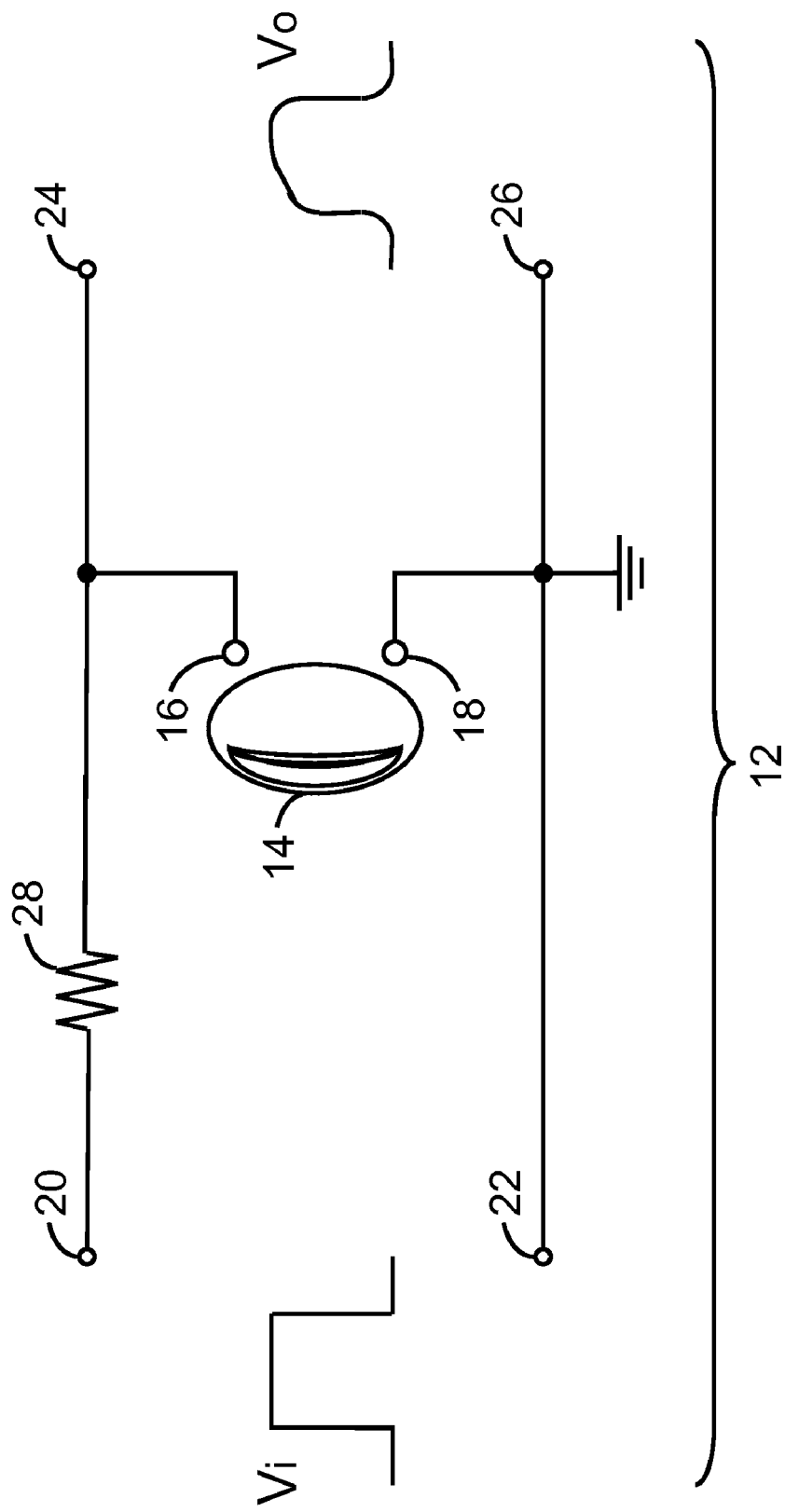
FIG. 3 is a diagram illustrating a principle of a biologic object detection device according to the first embodiment of the present invention.
Figure 4:
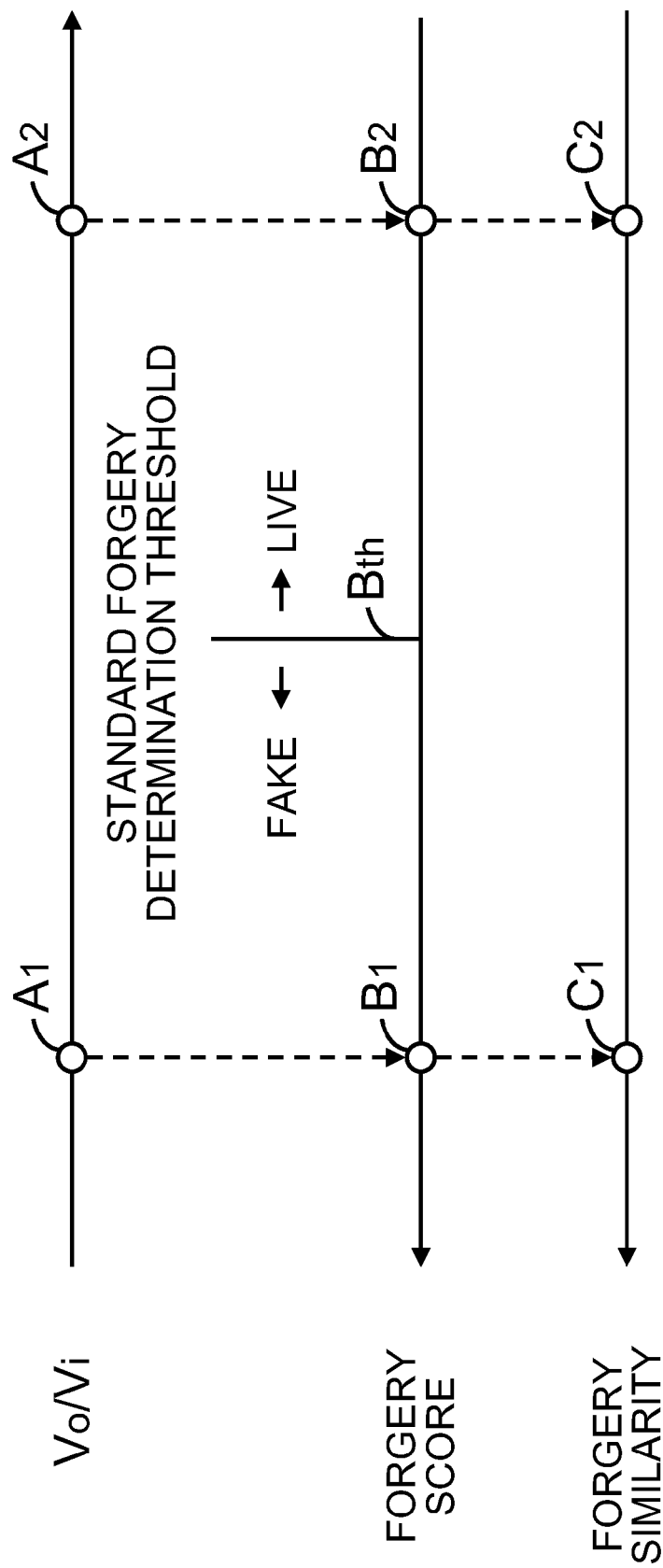
FIG. 4 is a diagram illustrating a method for calculating a forgery similarity according to the first embodiment of the present invention.

FIG. 3 is a diagram illustrating a principle of a biologic object detection device according to the first embodiment of the present invention. FIG. 4 is a diagram illustrating a method for calculating a forgery similarity according to the first embodiment of the present invention. FIG. 5 is a diagram illustrating a forgery similarity conversion table according to the first embodiment of the present invention. The configurations illustrated in FIGS. 3, 4, and 5 are examples, and the present invention is not limited to the configurations illustrated therein.

To calculate the forgery similarity, there are methods using biometric impedance (FIGS. 3 and 4), a method using a conversion table (FIG. 5), or the like, and any method may be employed.

Method for Calculating the Forgery Similarity

As illustrated in FIG. 3, a biologic object detection device 12 includes electrodes 16 and 18 onto which an object under test 14 such as a live finger contacts. An input voltage Vi is applied from input terminals 20 and 22 to the object under test 14 that contacts onto the electrodes 16 and 18. Then, an output voltage Vo obtained at output terminals 24 and 26 is measured, and an input-output voltage amplitude ratio (Vo/Vi) is calculated. The input voltage Vi is, for example, a square wave voltage, and the output voltage Vo has a waveform corresponding to an impedance of the object under test 14. Reference numeral 28 denotes a resistance. Depending on whether the input-output voltage amplitude ratio (Vo/Vi) is within a predetermined range, it is possible to determine whether the object under test 14 is a live finger or not. As compared to live fingers, a gummy finger made of gelatin is calculated to have a lower input-output voltage amplitude ratio (Vo/Vi).

In such a case, the forgery score is calculated as follows.

$$\text{forgery score} = 1 - V_o/V_i \qquad (1)$$

The forgery similarity is, as illustrated in FIG. 4, calculated on the basis of the input-output voltage amplitude ratio (Vo/Vi) and the forgery score. In FIG. 4, An (n=1 or 2) denotes the input-output voltage amplitude ratio (Vo/Vi), Bn (n=1 or 2) denotes the forgery score, and Cn (n=1 or 2) denotes the forgery similarity.

The smaller becomes the input-output voltage amplitude ratio (Vo/Vi), the larger is the value of the forgery similarity calculated. A live finger that has impedance similar to a fake (fake finger) may be calculated to have a forgery score higher than a standard forgery determination threshold Bth, and erroneously determined as a fake finger. The standard forgery determination threshold Bth is a forgery determination threshold used as a default value. That is, when the forgery score is higher than the standard forgery determination threshold, the determination result indicates a fake finger. When the forgery score is lower than the standard forgery determination threshold, the determination result indicates a live finger. In FIG. 4, with respect to forgery scores B1 and B2 (<B1), as for B1 (=A1, C1)≧Bth, the determination result indicates a fake finger As for B2 (=A2, C2)<Bth, the determination result indicates a live finger. It is noted that A1<A2, and C1>C2.

Use of Conversion Table in Calculation of the Forgery Similarity

To calculate the forgery similarity, as illustrated in FIG. 5, a forgery similarity conversion table 30 for converting an input-output voltage amplitude ratio (Vo/Vi) and a forgery score into a forgery similarity may be used. An input-output voltage amplitude ratio (Vo/Vi) is calculated to calculate a forgery score in accordance with the equation (1). Then, the forgery score is converted into a forgery similarity in accordance with the forgery similarity conversion table 30.

By use of the forgery similarity conversion table 30, when the forgery score is low, the forgery similarity is calculated to be a small value. For example, when forgery score=0.1, then, forgery similarity=1. When the forgery score is high, the forgery similarity is calculated to be a large value. For example, when forgery score=0.9, then, forgery similarity=8. In such a case, with forgery determination threshold of Vo/Vi=0.4 for example, the determination result indicates a fake when Vo/Vi≦0.4 (forgery similarity≧6).

Figure 6:
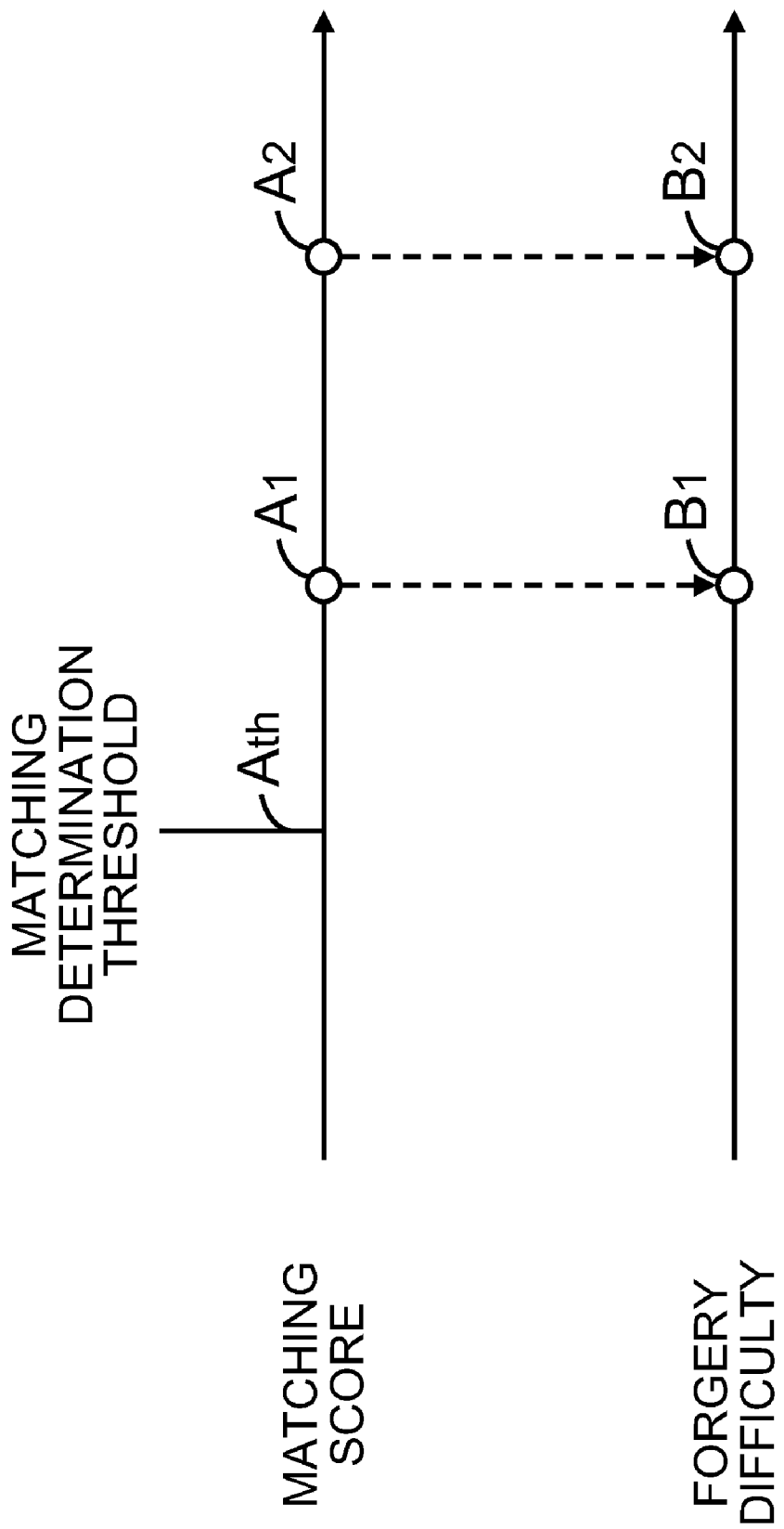
FIG. 6 is a diagram illustrating a method for calculating a forgery difficulty according to the first embodiment of the present invention.

FIG. 6 is a diagram illustrating a method for calculating a forgery difficulty according to the first embodiment of the present invention. FIG. 7 is a diagram illustrating a forgery difficulty conversion table according to the first embodiment of the present invention. The configurations illustrated in FIGS. 6 and 7 are examples, and the present invention is not limited to the configurations illustrated therein.

To calculate the forgery difficulty, there are methods using a matching score (FIG. 6), a method using a forgery difficulty conversion table (FIG. 7), or the like, and any method may be employed.

Method for Calculating the Forgery Difficulty

The forgery difficulty is an index of a difficulty in producing a fake. The forgery difficulty may be calculated on the basis of a matching score. As compared to a case of production of a fake (fake finger) that may obtain a score slightly higher than an genuineness determination threshold (matching determination threshold) for determining whether input data belongs to a genuine person, a production of a fake that may obtain a score greatly higher than the matching determination threshold is difficult. Accordingly, by using the matching score, as illustrated in FIG. 6, the forgery difficulty may be calculated. In FIG. 6, An (n=1 or 2) denotes the matching score, and Bn (n=1 or 2) denotes the forgery difficulty. A production of a fake that has a matching score A1 (forgery difficulty B1) that is slightly higher than a matching determination threshold Ath is easy. However, a production of a fake that has a matching score A2 (forgery difficulty B2) that is greatly higher than the matching determination threshold Ath is difficult. In FIG. 6, A1<A2, and B1<B2.

Use of Conversion Table in Calculation of the Forgery Difficulty

To calculate the forgery difficulty, as illustrated in FIG. 7, a forgery difficulty conversion table 32 for converting a matching score into a forgery difficulty may be used. In the forgery difficulty conversion table 32, when a matching score is low, the forgery difficulty is converted to be a small value. When the matching score is high, the forgery difficulty is converted to be a large value.

Figure 8A:
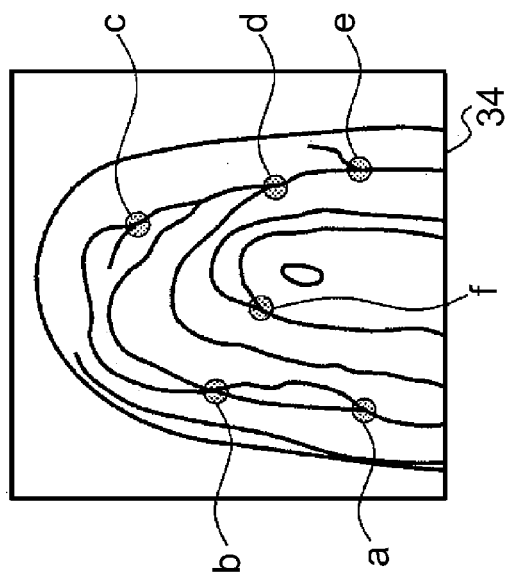
FIGS. 8A to 8C are diagrams illustrating a method for calculating a matching score in accordance with a minutia matching algorithm.
Figure 8B:
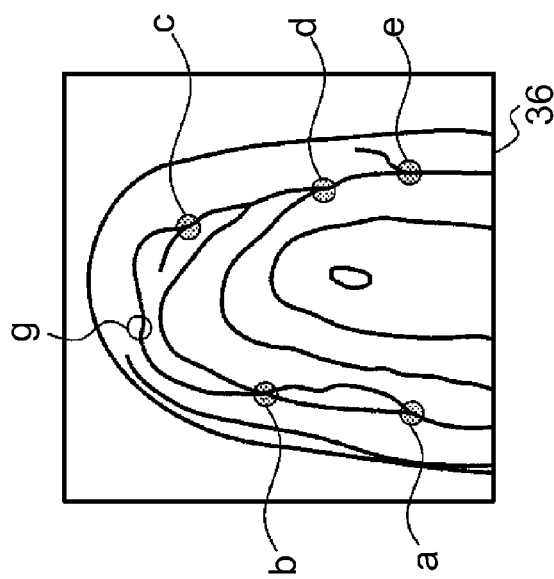
Figure 8C:
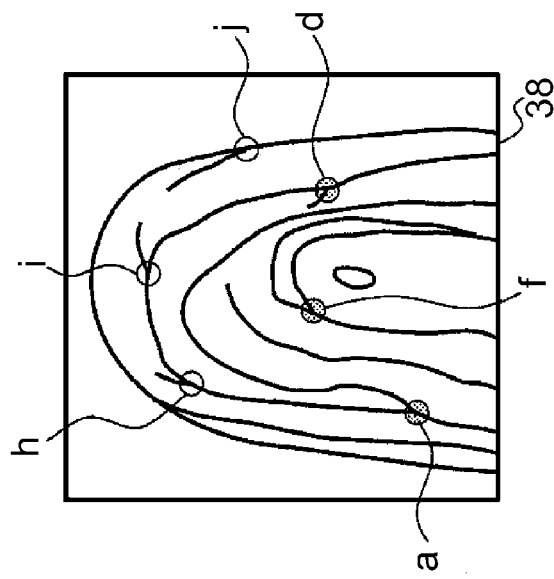

FIGS. 8A to 8C are diagrams illustrating a method for calculating a matching score in accordance with a minutia matching algorithm. The method illustrated in FIGS. 8A to 8C is an example, and the present invention is not limited to the method illustrated therein.

FIG. 8A illustrates registered minutia data as registered biometric data. The registered minutia data 34 includes minutiae a, b, c, d, e, and f. For simplicity, six minutiae are illustrated. FIGS. 8B and 8C illustrate input minutia data as input data. The input minutia data 36 (FIG. 8B) includes minutiae a, b, c, d, e, and g, and the input minutia data 38 (FIG. 8C) includes minutiae a, d, f, h, i, and j.

The registered minutia data 34 is used to examine matching to the input minutia data 36 or the input minutia data 38. By the matching, to the input minutia data 36, the registered minutia data 34 matches at five minutiae a, b, c, d, and e, out of the six points, and accordingly, the matching score is 5/6. In contrast, to the input minutia data 38, the registered minutia data 34 matches only at three minutiae a, d, and f, out of the six points, and accordingly, the matching score is 3/6. When a matching determination threshold is set to 4/6, it is determined that the input minutia data 36 matches to the registered minutia data 34 and belongs to the genuine person, and the input minutia data 38 belongs to anyone else.

As disclosed above, in the minutia matching algorithm, the matching score is given as the number of matched minutiae. However, for the similarity, other factors may be used, and the method for calculating the matching score is not limited to the number or ratio of matched points among the minutia.

To calculate the matching score (similarity), a known method may be used. Generally in fingerprint authentication, a matching score (similarity) is calculated and depending on whether the matching score is higher than or equal to a matching determination threshold, it is determined that the input data belongs to the genuine person. The data for matching includes minutia data, pattern data, or the like. The minutia matching algorithms includes, as disclosed above, an algorithm in which the number of matched minutiae between minutiae included in the registered minutia data and minutiae included in the input minutia data is calculated, and the matching score is calculated on the basis of a ratio of the matched minutia. To increase matching accuracy, an algorithm using types (ridge ending, bifurcation, etc.) of minutiae, features of fingerprint ridges between minutiae, or the like may be used. Further, as in a pattern matching algorithm, a matching score may be calculated on the basis of a ratio of matched image area between a binary image of registered matching data and a binary image of input matching data. Matching data is data for determining whether input data belongs to a genuine person.

Figure 9:
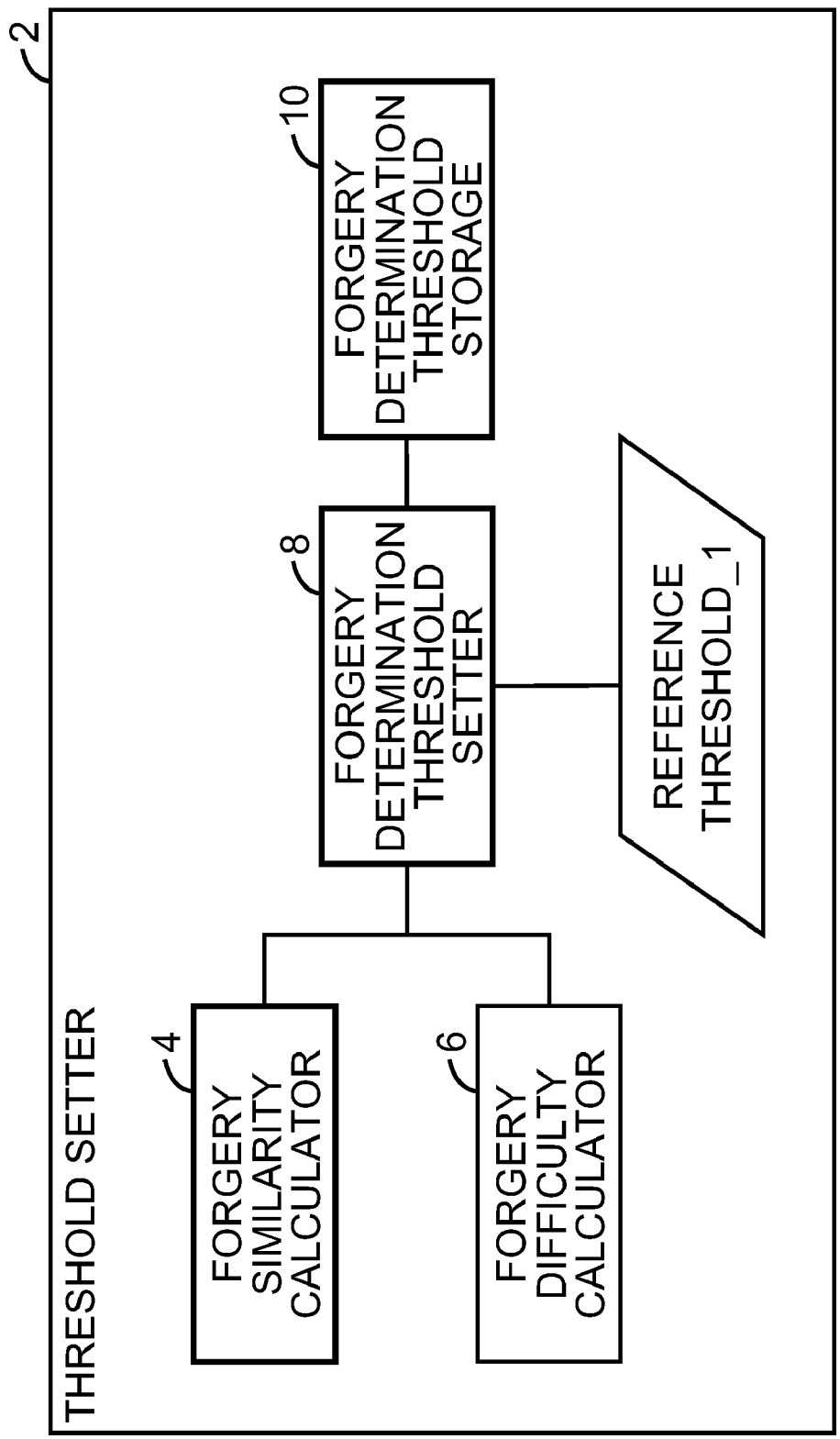
FIG. 9 is a diagram illustrating a configuration of a threshold setter according to the first embodiment of the present invention.
Figure 10:
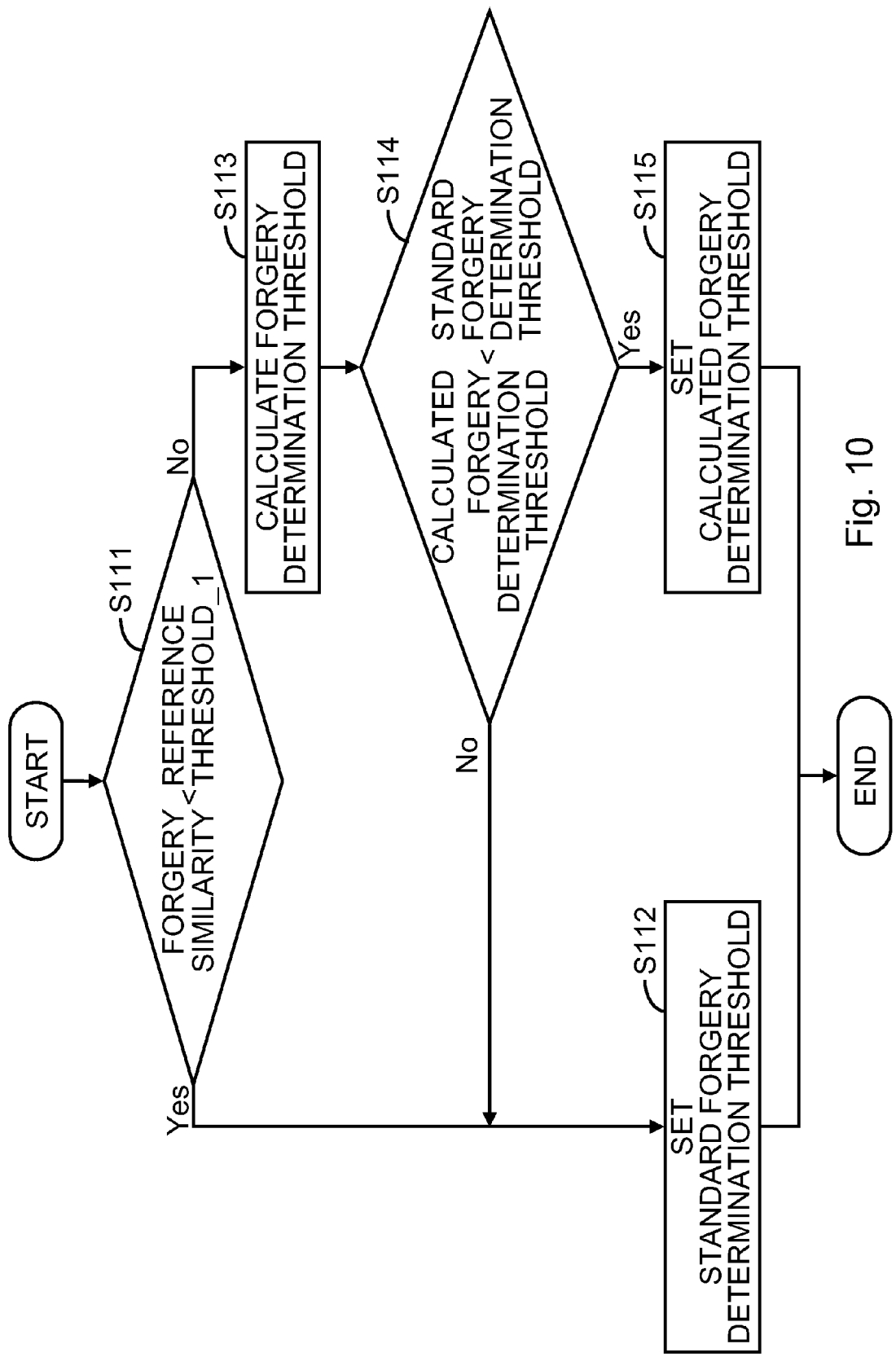
FIG. 10 is a flowchart illustrating a flow of a process for determining a forgery determination threshold according to the first embodiment of the present invention.
Figure 11:
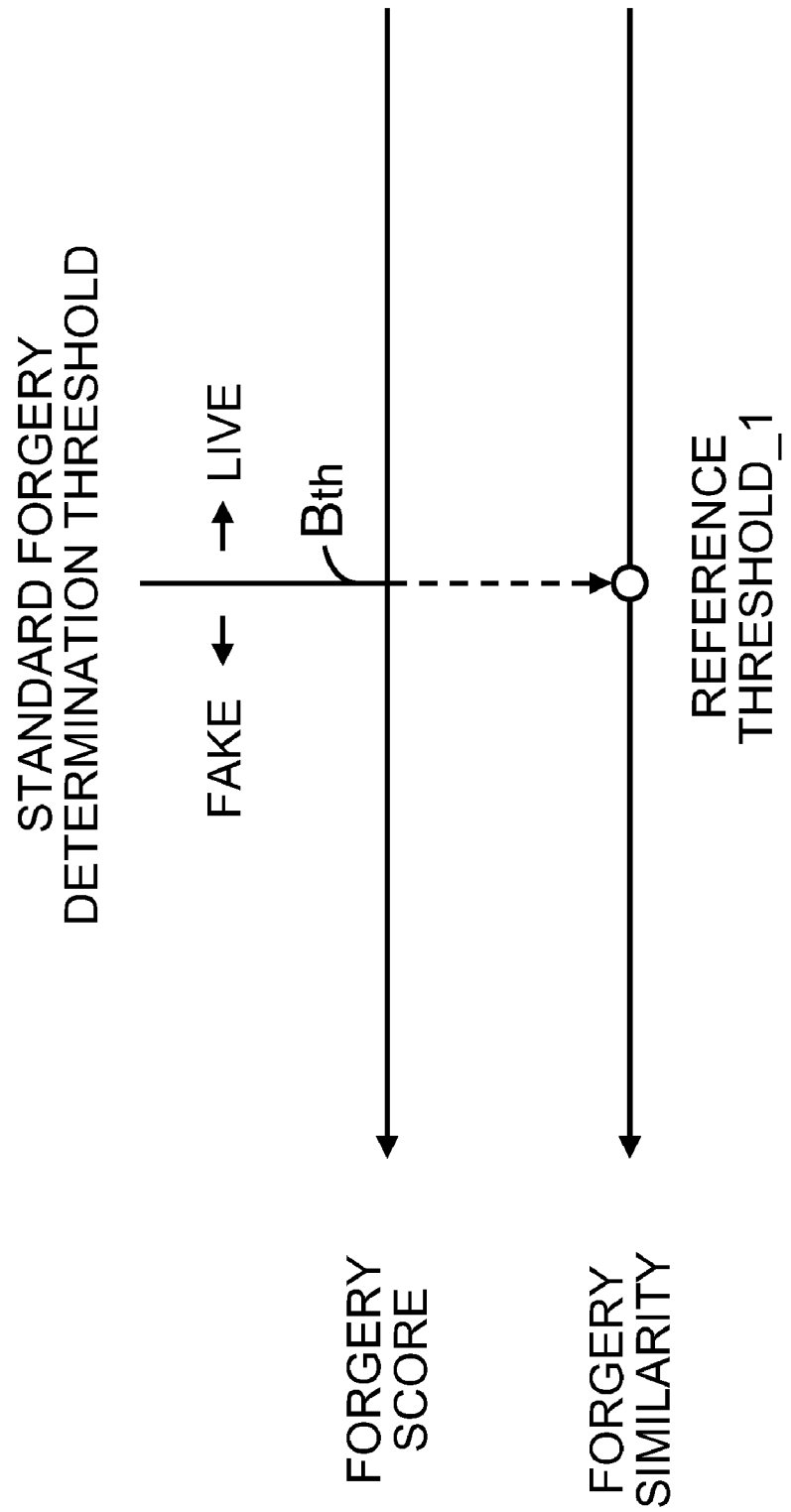
FIGS. 11 and 12 are diagrams illustrating a method for setting a reference threshold_1 according to the first embodiment of the present invention.
Figure 12:
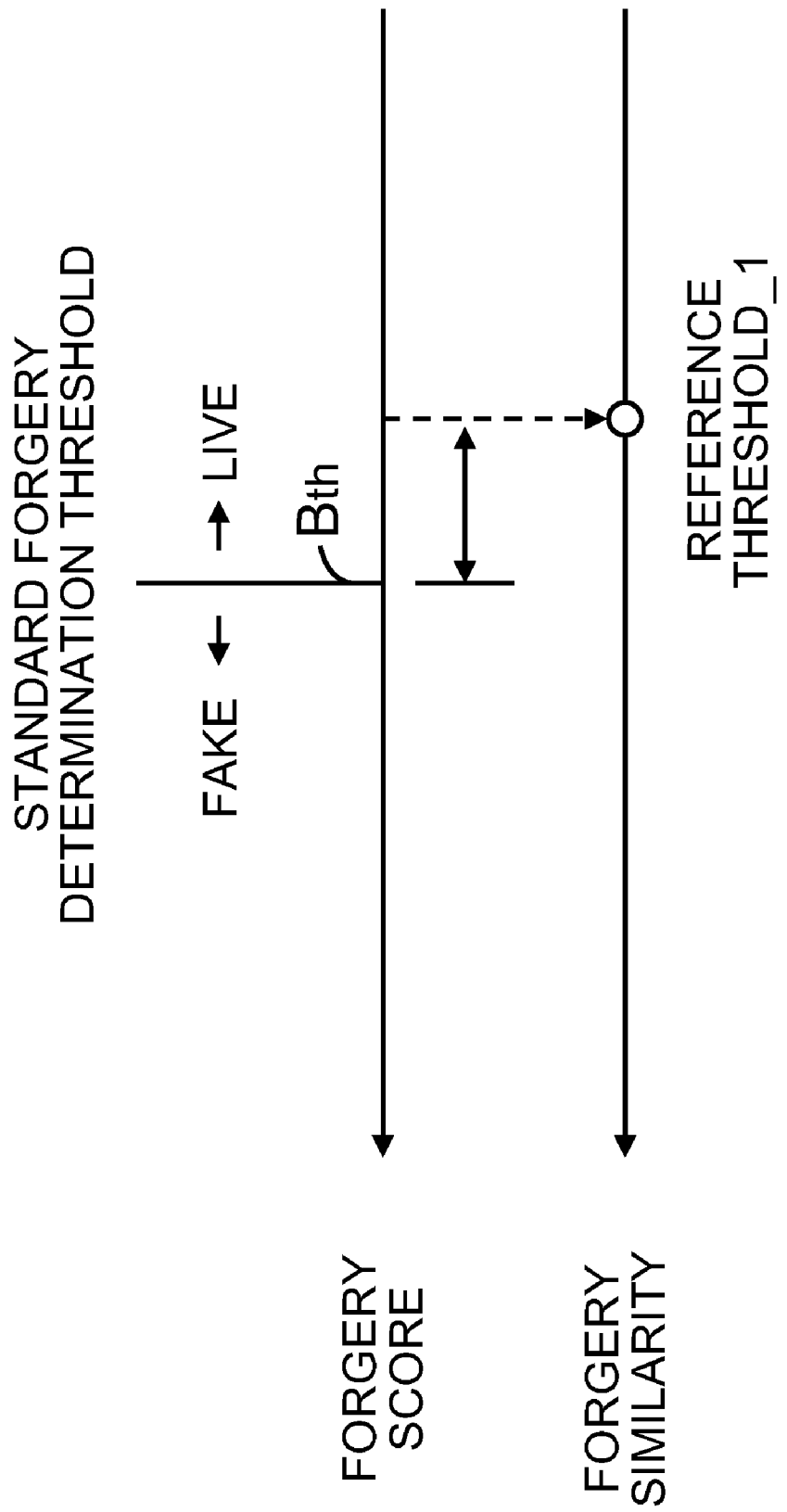
Figure 13:
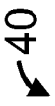
FIG. 13 is a diagram illustrating a forgery determination threshold conversion table according to the first embodiment of the present invention.

FIG. 9 is a diagram illustrating a configuration of a threshold setter according to the first embodiment of the present invention. In FIG. 9, like elements are denoted with like reference numerals as in FIG. 1. FIG. 10 is a flowchart illustrating a flow of a process for determining a forgery determination threshold according to the first embodiment of the present invention. FIGS. 11 and 12 are diagrams illustrating a method for setting a reference threshold_1 according to the first embodiment of the present invention. FIG. 13 is a diagram illustrating a forgery determination threshold conversion table according to the first embodiment of the present invention.

In the example illustrated in FIG. 9 of setting threshold, the forgery similarity calculator 4 calculates a forgery similarity, and the forgery determination threshold setter 8 calculates a forgery determination threshold on the basis of the reference threshold_1 that has been set in advance. The forgery determination threshold is stored in the forgery determination threshold storage 10.

The process is an example of calculating and setting a forgery determination threshold on the basis of the reference threshold_1 for the forgery similarity in an authentication method.

In the process, as illustrated in FIG. 10, the reference threshold_1 is set as a first reference threshold for a forgery similarity.

In operation S111, the forgery determination threshold setter 8 determines whether the forgery similarity is lower than the reference threshold_1 (forgery similarity<reference threshold_1).

In operation S112, when the forgery similarity is lower than the reference threshold_1 (operation S111: Yes), the forgery determination threshold setter 8 sets a standard forgery determination threshold as the forgery determination threshold, and the process is finished.

As mentioned above, the standard forgery determination threshold is a forgery determination threshold used as a default value. The standard forgery determination threshold is used to prevent the forgery determination threshold from being unnecessarily increased. Accordingly, the standard forgery determination threshold is a maximum value of the forgery determination threshold, and indicates a value that may maintain security against the forgery authentication even for a finger that has a low forgery difficulty (that is, easy to fake).

In operation S113, when the forgery similarity is not lower than the reference threshold_1 (operation S111: No), the forgery determination threshold setter 8 calculates, on the basis of a forgery difficulty, a forgery determination threshold that may maintain a difficulty in impersonation with a fake.

In operation S114, the forgery determination threshold setter 8 determines whether the calculated forgery determination threshold is lower than the standard forgery determination threshold (calculated forgery determination threshold<standard forgery determination threshold). When the calculated forgery determination threshold is not lower than the standard forgery determination threshold (operation S114: No), the process proceeds to operation S112.

In operation S115, when the calculated forgery determination threshold is lower than the standard forgery determination threshold (operation S114: Yes), the forgery determination threshold setter 8 sets the calculated forgery determination threshold as the forgery determination threshold, and the process is finished.

Through the setting process disclosed above, when the forgery similarity is lower than the reference threshold_1, the standard forgery determination threshold is set. When the forgery similarity is higher than or equal to the reference threshold_1, the forgery determination threshold that may maintain the difficulty in impersonation with a fake is calculated on the basis of the forgery difficulty. Further, when the calculated forgery determination threshold is lower than the standard forgery determination threshold, the calculated forgery determination threshold is set. When the calculated forgery determination threshold is higher than or equal to the standard forgery determination threshold, the standard forgery determination threshold is set.

In the process, as illustrated in FIG. 11, a value obtained by converting the standard forgery determination threshold into the forgery similarity may be used as the reference threshold_1 (operation S111). In FIG. 11, Bth denotes the standard forgery determination threshold.

In setting the reference threshold_1, for example, the biologic object detection device 12 (FIG. 3) is used. In such a case, the input-output voltage amplitude ratio varies for each input from substantially the same object under test. Accordingly, even if the forgery similarity is lower than or equal to the reference threshold_1, the object under test may be often erroneously determined as a fake. To avoid such a fluctuation, as illustrated in FIG. 12, in consideration of the input fluctuation, the reference threshold_1 (<Bth) that is lower than the standard forgery determination threshold (Bth) may be set.

Further in the operation where "the forgery determination threshold setter 8 calculates, on the basis of a forgery difficulty, a forgery determination threshold that may maintain a difficulty in impersonation with a fake (operation S113)", for example, a forgery determination threshold conversion table 42 (FIG. 17) may be provided, and the forgery determination threshold setter 8 may calculate the forgery determination threshold in accordance with the forgery determination threshold conversion table 42. In a case where a forgery difficulty is high (forgery is difficult), the forgery determination threshold is calculated to be a small value. With the example of the forgery determination threshold conversion table 42 (FIG. 17), when the forgery difficulty is 9, for example, the forgery determination threshold may be lowered to 0.1.

In the setting of the forgery determination threshold, as illustrated in FIG. 13, a forgery determination threshold conversion table 40 for calculating a forgery determination threshold corresponding to a forgery similarity may be provided, and the forgery determination threshold setter 8 may convert the forgery similarity into the forgery determination threshold.

Figure 14:
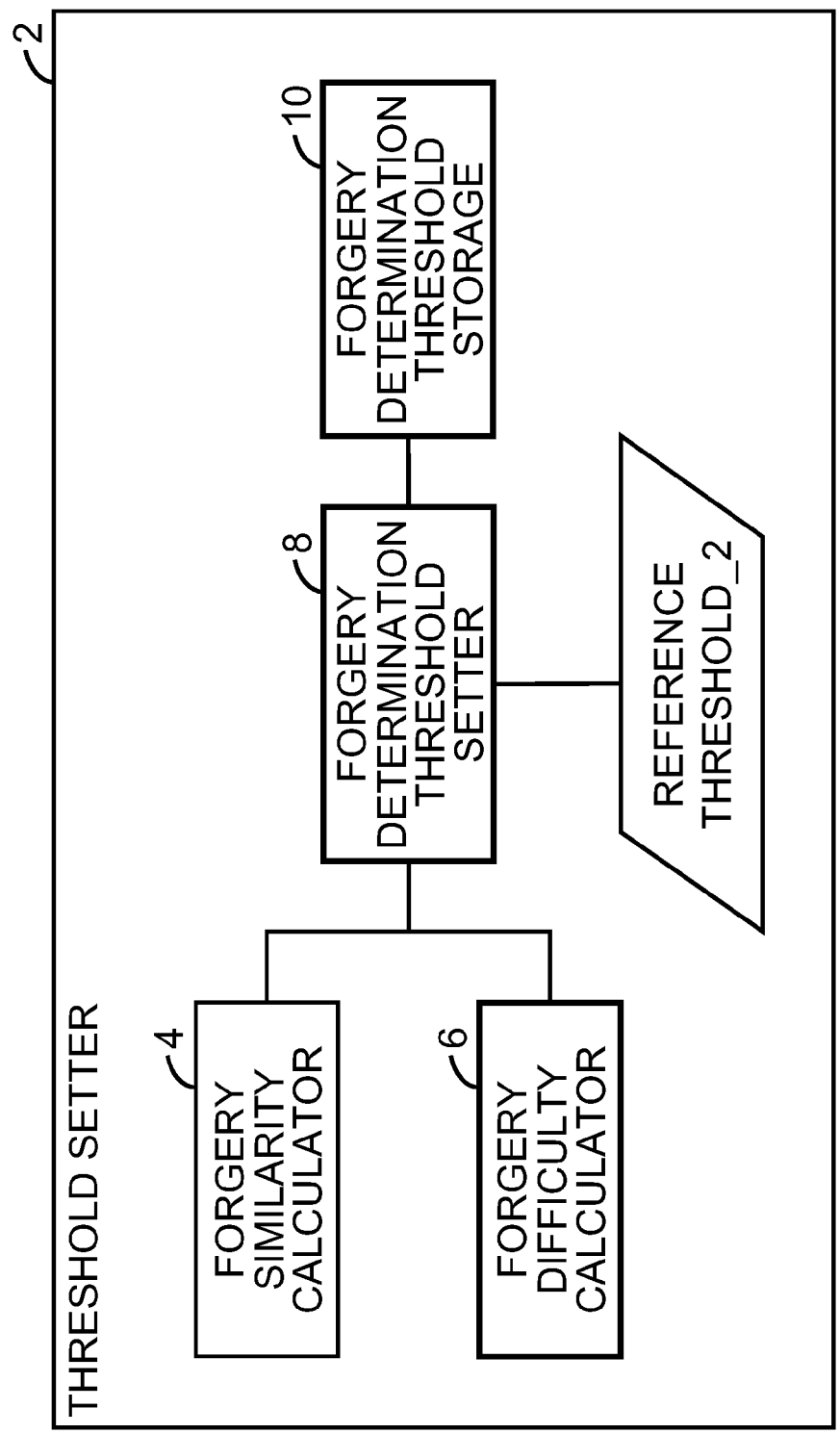
FIG. 14 is a diagram illustrating a configuration of a threshold setter according to the first embodiment of the present invention.
Figure 15:
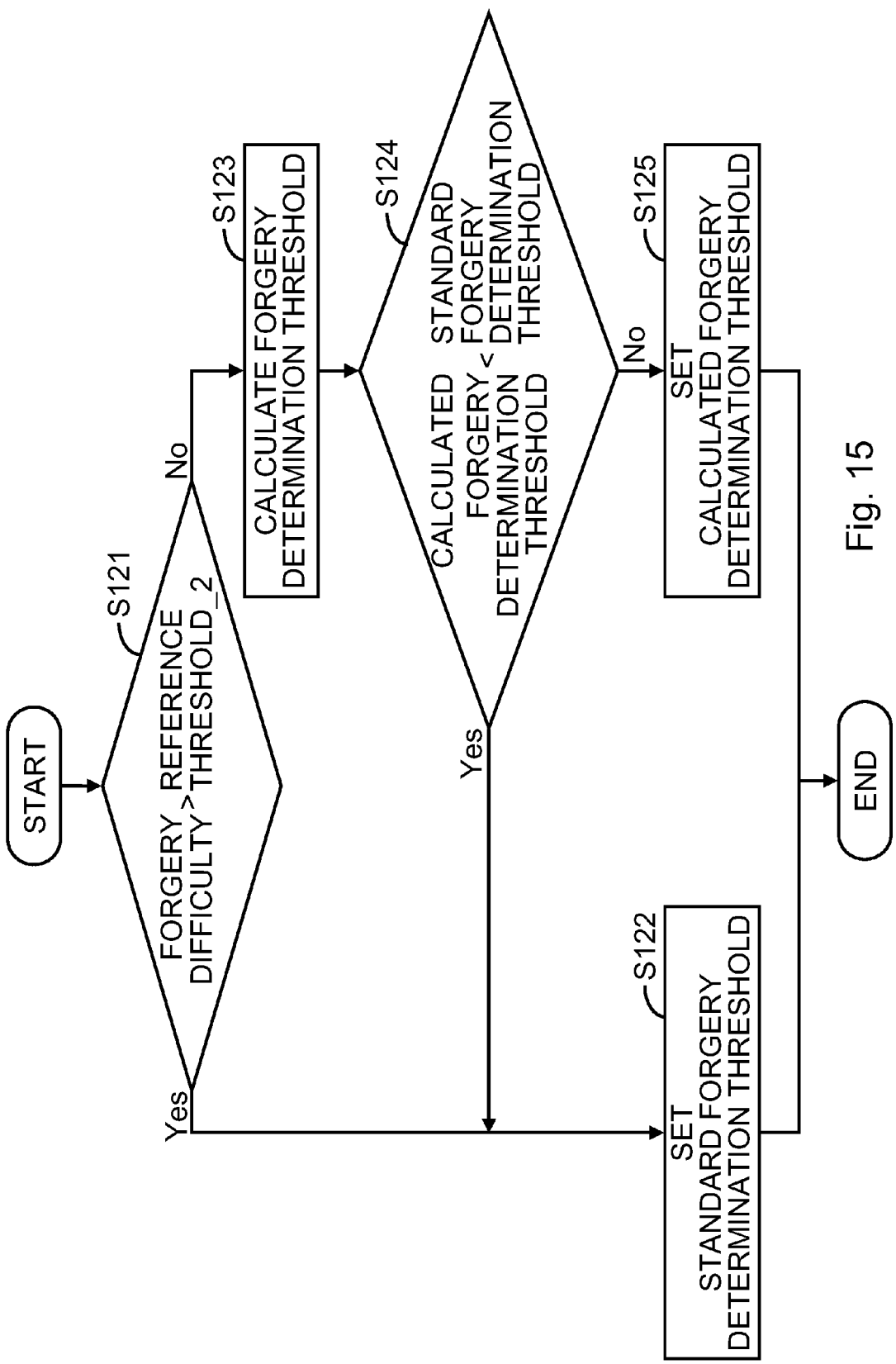
FIG. 15 is a flowchart illustrating a flow of a process for determining a forgery determination threshold according to the first embodiment of the present invention.
Figure 16:
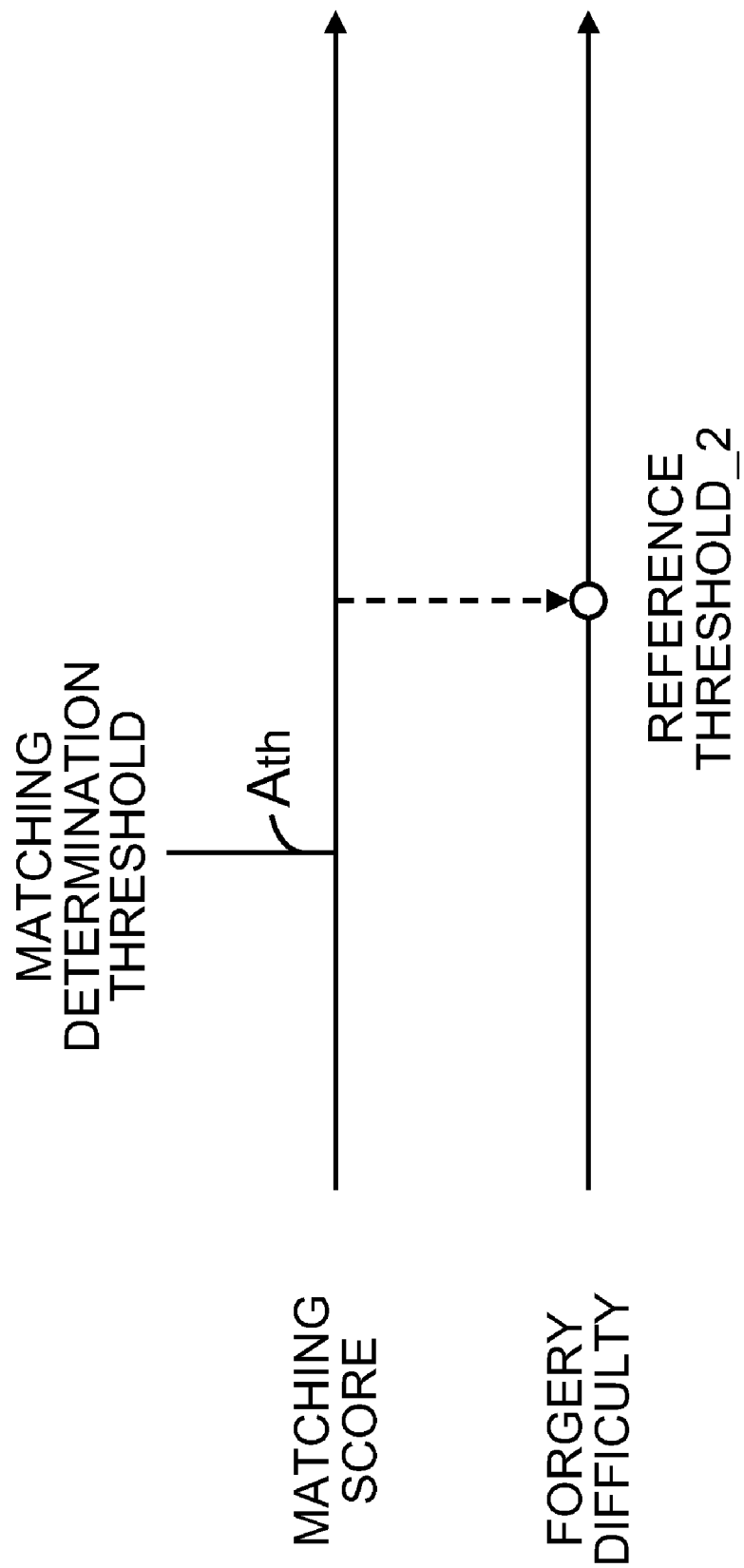
FIG. 16 is a diagram illustrating a method for setting a reference threshold_2 according to the first embodiment of the present invention.

FIG. 14 is a diagram illustrating a configuration of a threshold setter according to the first embodiment of the present invention. In FIG. 14, like elements are denoted with like reference numerals as in FIGS. 1 and 9. FIG. 15 is a flowchart illustrating a flow of a process for determining a forgery determination threshold according to the first embodiment of the present invention. FIG. 16 is a diagram illustrating a method for setting a reference threshold_2 according to the first embodiment of the present invention. FIG. 17 is a diagram illustrating a forgery determination threshold conversion table according to the first embodiment of the present invention.

In the example illustrated in FIG. 14 of setting threshold, the forgery difficulty calculator 6 calculates a forgery difficulty, and the forgery determination threshold setter 8 calculates a forgery determination threshold on the basis of the reference threshold_2 that has been set in advance. The forgery determination threshold is stored in the forgery determination threshold storage 10.

The process is an example of calculating and setting a forgery determination threshold on the basis of the reference threshold_2 for the forgery difficulty in an authentication method.

In the process, as illustrated in FIG. 15, the reference threshold_2 is set as a second reference threshold for a forgery difficulty.

In operation S121, the forgery determination threshold setter 8 determines whether the forgery difficulty is higher than the reference threshold_2 (forgery difficulty>reference threshold_2).

In operation S122, when the forgery difficulty is higher than the reference threshold_2 (operation S121: Yes), the forgery determination threshold setter 8 sets a standard forgery determination threshold as the forgery determination threshold, and the process is finished.

As mentioned above, the standard forgery determination threshold is a forgery determination threshold used as a default value. The standard forgery determination threshold is used to prevent the forgery determination threshold from being unnecessarily lowered. Accordingly, the standard forgery determination threshold is a minimum value of the forgery determination threshold, and indicates a value that may not maintain security against the forgery authentication with a forgery determination threshold lower than the minimum value, even for a finger that has a high forgery difficulty (that is, difficult to make).

In operation S123, when the forgery difficulty is not higher than the reference threshold_2 (operation S121: No), the forgery determination threshold setter 8 calculates, on the basis of a forgery similarity, a forgery determination threshold that may maintain a difficulty to be erroneously determined as a fake.

In operation S124, the forgery determination threshold setter 8 determines whether the calculated forgery determination threshold is lower than the standard forgery determination threshold (calculated forgery determination threshold<standard forgery determination threshold). When the calculated forgery determination threshold is lower than the standard forgery determination threshold (operation S124: Yes), the process proceeds to operation S122.

In operation S125, when the calculated forgery determination threshold is not lower than the standard forgery determination threshold (operation S124: No), the forgery determination threshold setter 8 sets the calculated forgery determination threshold as the forgery determination threshold, and the process is finished.

Through the setting process disclosed above, when the forgery difficulty is higher than the reference threshold_2, the standard forgery determination threshold is set. When the forgery difficulty is lower than or equal to the reference threshold_2, the forgery determination threshold that may maintain the difficulty to be erroneously determined as a fake is calculated on the basis of the forgery similarity. Further, when the calculated forgery determination threshold is higher than or equal to the standard forgery determination threshold, the calculated forgery determination threshold is set. When the calculated forgery determination threshold is lower than the standard forgery determination threshold, the standard forgery determination threshold is set.

In the process, the reference threshold_2 is a threshold that has been set in advance. For example, as illustrated in FIG. 16, the reference threshold_2 may be set by calculating in advance, through an experiment, or the like, a matching score of a level at which forgery is difficult, converting the matching score into a forgery difficulty, and setting the converted value as the reference threshold_2. In FIG. 16, the reference threshold_2 is set to a value higher than a matching determination threshold Ath.

In the operation where "the forgery determination threshold setter 8 calculates, on the basis of a forgery similarity, a forgery determination threshold that may maintain a difficulty to be erroneously determined as a fake" (operation S123), for example, the forgery determination threshold conversion table 40 (FIG. 13) may be provided, and the forgery determination threshold setter 8 may calculate the forgery determination threshold in accordance with the forgery determination threshold conversion table 40. In a case where the forgery similarity is high (easy to be erroneously determined as a fake finger), the forgery determination threshold is calculated to be a small value. According to the forgery determination threshold conversion table 40 (FIG. 13), when the forgery difficulty is 6, for example, the erroneous determination due to a fake may be prevented with a forgery determination threshold of 0.1 or less.

Further, in the setting of the forgery determination threshold, as illustrated in FIG. 17, the forgery determination threshold conversion table 42 for calculating a forgery determination threshold corresponding to a forgery difficulty may be provided, and the forgery determination threshold setter 8 may convert the forgery difficulty into the forgery determination threshold.

Figure 18:
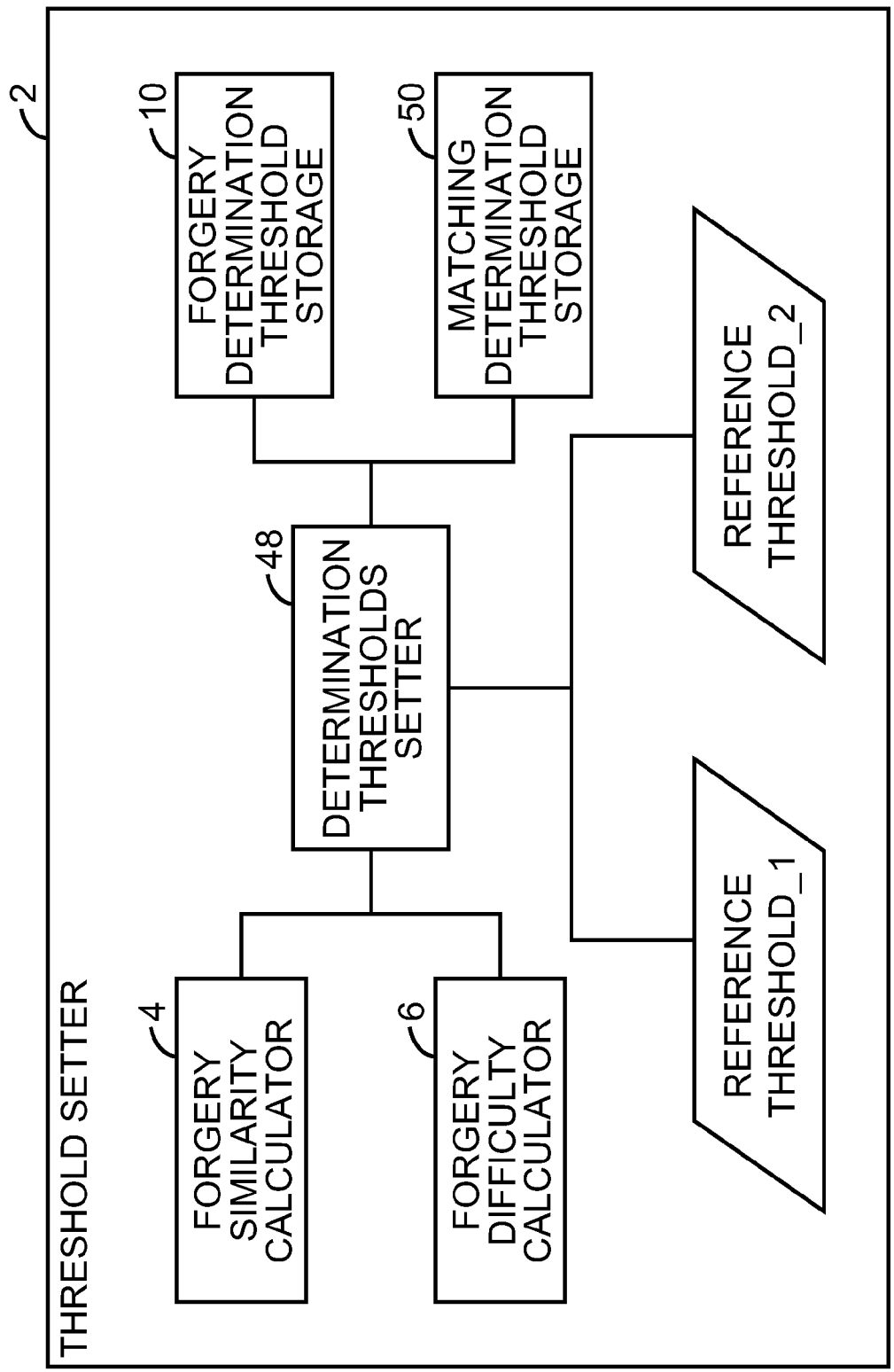
FIG. 18 is a block diagram illustrating a threshold setter according to a second embodiment of the present invention.
Figure 19:
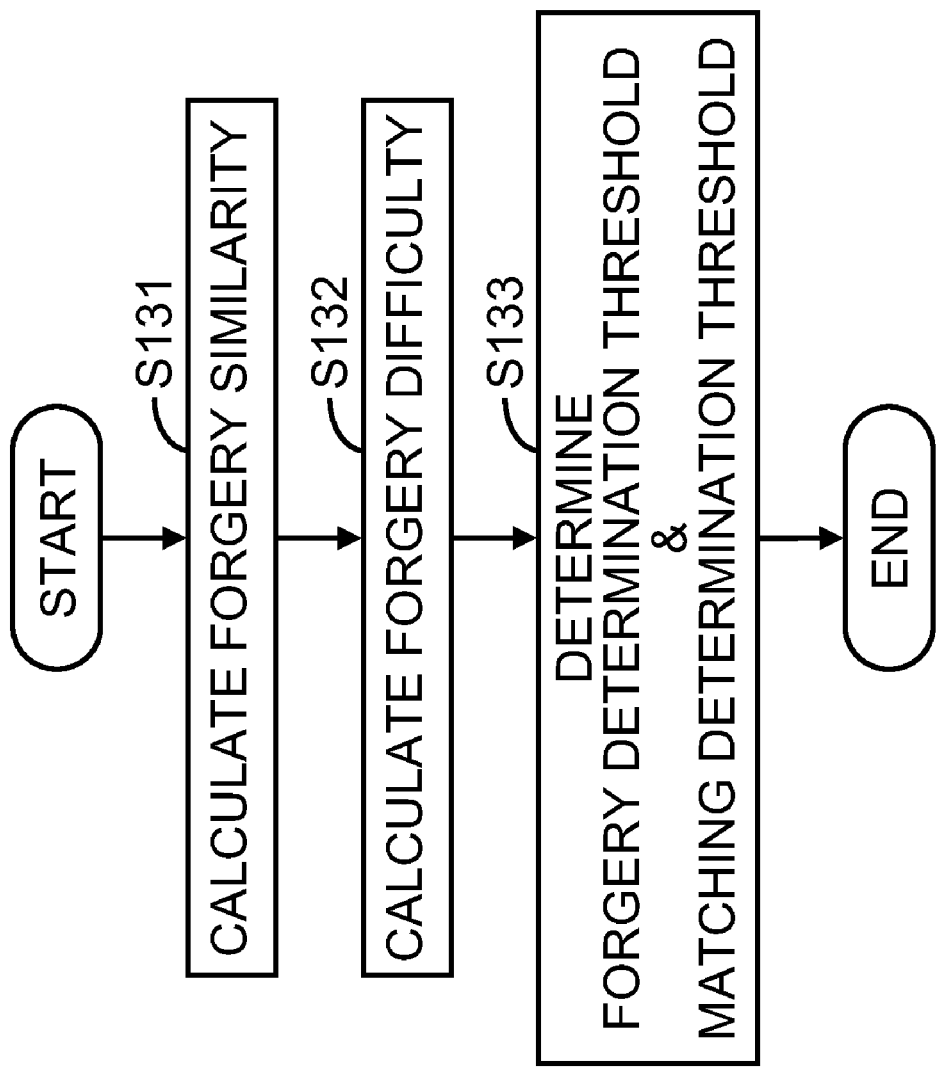
FIG. 19 is a flowchart illustrating a flow of a process for setting thresholds according to the second embodiment of the present invention.

FIG. 18 is a block diagram illustrating a threshold setter according to a second embodiment of the present invention. In FIG. 18, like elements are denoted with like reference numerals as in FIG. 1. FIG. 19 is a flowchart illustrating a flow of a process for setting thresholds according to the second embodiment of the present invention. The configurations illustrated in FIGS. 18 and 19 are examples, and the present invention is not limited to the configurations illustrated therein.

As illustrated in FIG. 18, the threshold setter 2 includes a forgery similarity calculator 4, a forgery difficulty calculator 6, a determination thresholds setter 48, a forgery determination threshold storage 10, and a matching determination threshold storage 50. The threshold setter 2 sets a forgery determination threshold and a matching determination threshold as thresholds used to prevent that a fake (for example, a gummy finger) is erroneously determined as a biologic object. Since the forgery similarity calculator 4, the forgery difficulty calculator 6, and the forgery determination threshold storage 10 are similar to those in the threshold setter 2 illustrated in FIG. 1, descriptions thereof are omitted.

The determination thresholds setter 48 calculates and setting a forgery determination threshold and a matching determination threshold. In the second embodiment, the determination thresholds setter 48 calculates and sets the forgery determination threshold and the matching determination threshold on the basis of a forgery similarity calculated by the forgery similarity calculator 4, a forgery difficulty calculated by the forgery difficulty calculator 6, and the reference threshold_1 and the reference threshold_2 that are set in advance.

In the second embodiment, stores determination thresholds, the matching determination threshold storage 50 is provided in addition to the forgery determination threshold storage 10. The matching determination threshold storage 50 stores the matching determination threshold.

In the process illustrated in FIG. 19, as disclosed above, input data is used to set a forgery determination threshold.

In operation S131, input data is input to the forgery similarity calculator 4, and the forgery similarity calculator 4 calculates a forgery similarity on the basis of the input data.

In operation S132, after the calculation, input data of substantially the same part of the same person is input to the forgery difficulty calculator 6, and the forgery difficulty calculator 6 calculates a forgery difficulty on the basis of the input data. The calculation of the forgery similarity and the calculation of the forgery difficulty may be performed in reverse or at substantially the same time.

In operation S133, the determination thresholds setter 48 determines a forgery determination threshold and a matching determination threshold on the basis of the forgery similarity and the forgery difficulty. The forgery determination threshold is stored in the forgery determination threshold storage 10, and the matching determination threshold is stored in the matching determination threshold storage 50. Then, the process is finished.

As disclosed above, the forgery determination threshold and the matching determination threshold are set using both of the forgery difficulty and the forgery similarity. Accordingly, it is possible to reduce an erroneous determination that a biologic object is determined as a fake while security is maintained.

Figure 20:
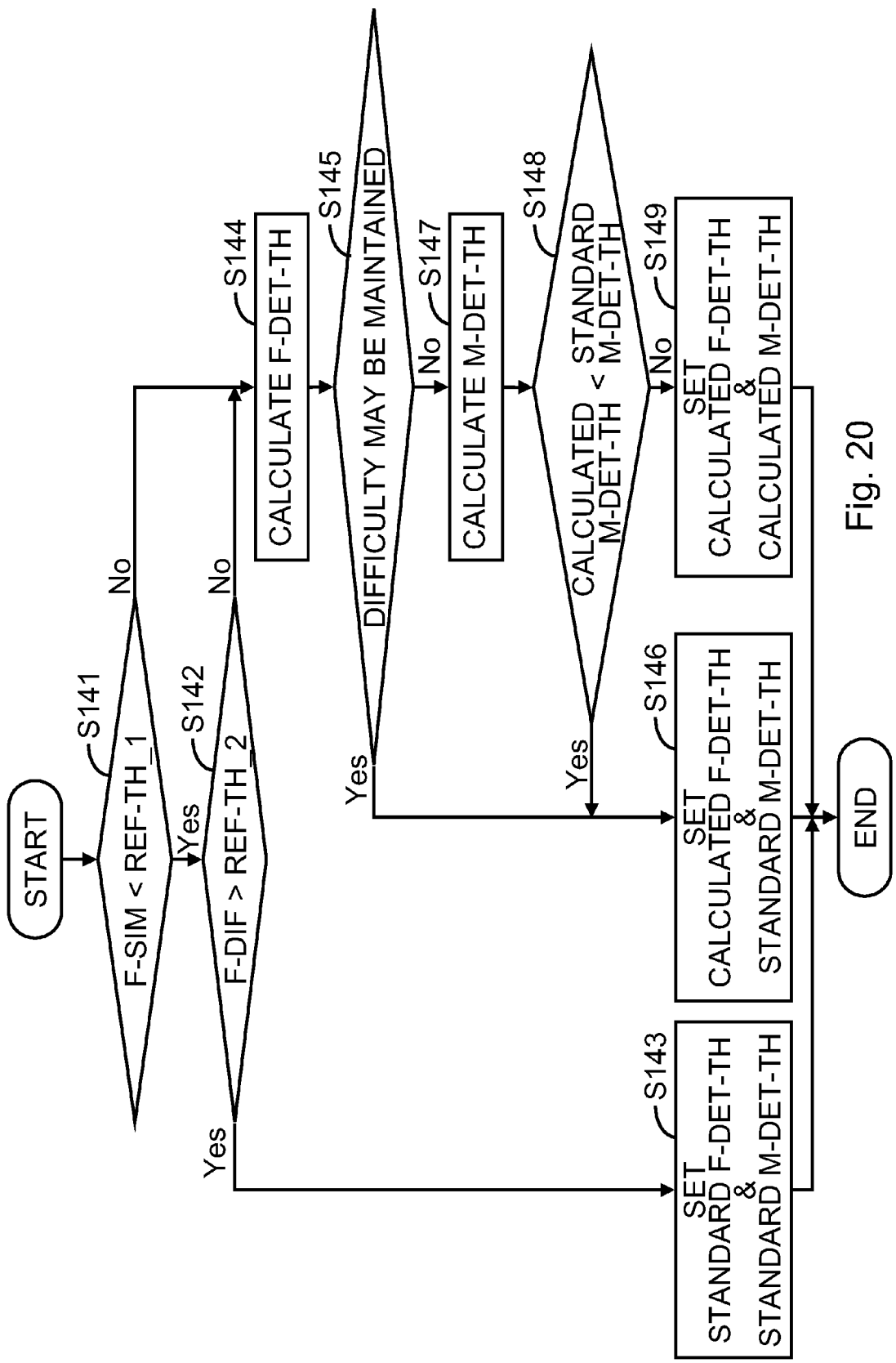
FIG. 20 is a flowchart illustrating a flow of a process for determining thresholds according to the second embodiment of the present invention.

FIG. 20 is a flowchart illustrating a flow of a process for determining thresholds according to the second embodiment of the present invention. The configuration illustrated in FIG. 20 is an example, and the present invention is not limited to the configuration illustrated in FIG. 20.

The process is an example of calculating and setting a forgery determination and a matching determination threshold on the basis of the reference threshold_1 for the forgery similarity and the reference threshold_2 for the forgery difficulty in an authentication method. In FIG. 20, F-SIM, F-DIF, REF-TH_1, REF-TH_2, F-DET-TH, and M-DET-TH denote the forgery similarity, the forgery difficulty, the reference threshold_1, the reference threshold_2, the forgery determination threshold, and the matching determination threshold, respectively.

In operation S141, the determination thresholds setter 48 determines whether a forgery similarity is lower than the reference threshold_1 (F-SIM<REF-TH_1).

In operation S142, when the forgery similarity is lower than the reference threshold_1 (operation S141: Yes), the determination thresholds setter 48 determines whether the forgery difficulty is higher than the reference threshold_2 (F-DIF>REF-TH_2).

In operation S143, when the forgery difficulty is higher than the reference threshold_2 (operation S142: Yes), the determination thresholds setter 48 sets a standard forgery determination threshold and a standard matching determination threshold as the forgery determination threshold and the matching determination threshold, respectively, and the process is finished.

The setting of the thresholds in operations S141 to 143 is referred to as a setting condition_1.

The standard matching determination threshold is used to prevent the matching determination threshold from being unnecessarily lowered. Accordingly, the standard matching determination threshold is a minimum value of the matching determination threshold, and indicates a value that may not maintain security in the finger authentication with a matching determination threshold lower than the minimum value.

In operation S144, If the forgery similarity is not lower than the reference threshold_1 (operation S141: No), and the forgery difficulty is not higher than the reference threshold_2 (operation S142: No), that is, the setting condition_1 is not satisfied, the determination thresholds setter 48 calculates a forgery determination threshold that may maintain a difficulty to be erroneously determined as a fake on the basis of the forgery similarity.

To calculate the forgery determination threshold that may maintain the difficulty to be erroneously determined as a fake, a comparison table, for example, may be provided in advance. Then, the forgery determination threshold may be calculated in accordance with the comparison table.

In operation S145, the determination thresholds setter 48 compares the calculated forgery determination threshold with the forgery difficulty to determine whether the difficulty in impersonation with a fake may be maintained or not.

In operation S146, when it is determined that the difficulty in impersonation with a fake may be maintained (operation S145: Yes), the determination thresholds setter 48 sets the calculated forgery determination threshold and the standard matching determination threshold as the forgery determination threshold and the matching determination threshold, respectively, and the process is finished. The setting of the determination thresholds in operations S141, S142, and S144 to S146 is referred to as a setting condition_2.

In operation S147, when the difficulty in impersonation with a fake may not be maintained (operation S145: No), the determination thresholds setter 48 calculates a matching determination threshold that may maintain the difficulty in impersonation with a fake.

In operation S148, the determination thresholds setter 48 determines whether the calculated matching determination threshold is lower than the standard matching determination threshold (calculated M-DET-TH<standard M-DET-TH). When the calculated matching determination threshold is lower than the standard matching determination threshold (operation S148: Yes), the process proceeds to operation S146. The setting of the determination thresholds in operations S141, S142, S144, S145, S147, S148, and S146 is referred to as a setting condition_3.

In operation S149, when the calculated matching determination threshold is not lower than the standard matching determination threshold (operation S148: No), the determination thresholds setter 48 sets the calculated forgery determination threshold and the calculated matching determination threshold as the forgery determination threshold and the matching determination threshold, respectively, and the process is finished. The setting of the determination thresholds in operations S141, S142, S144, S145, S147, S148, and S149 is referred to as a setting condition_4.

Figure 21:
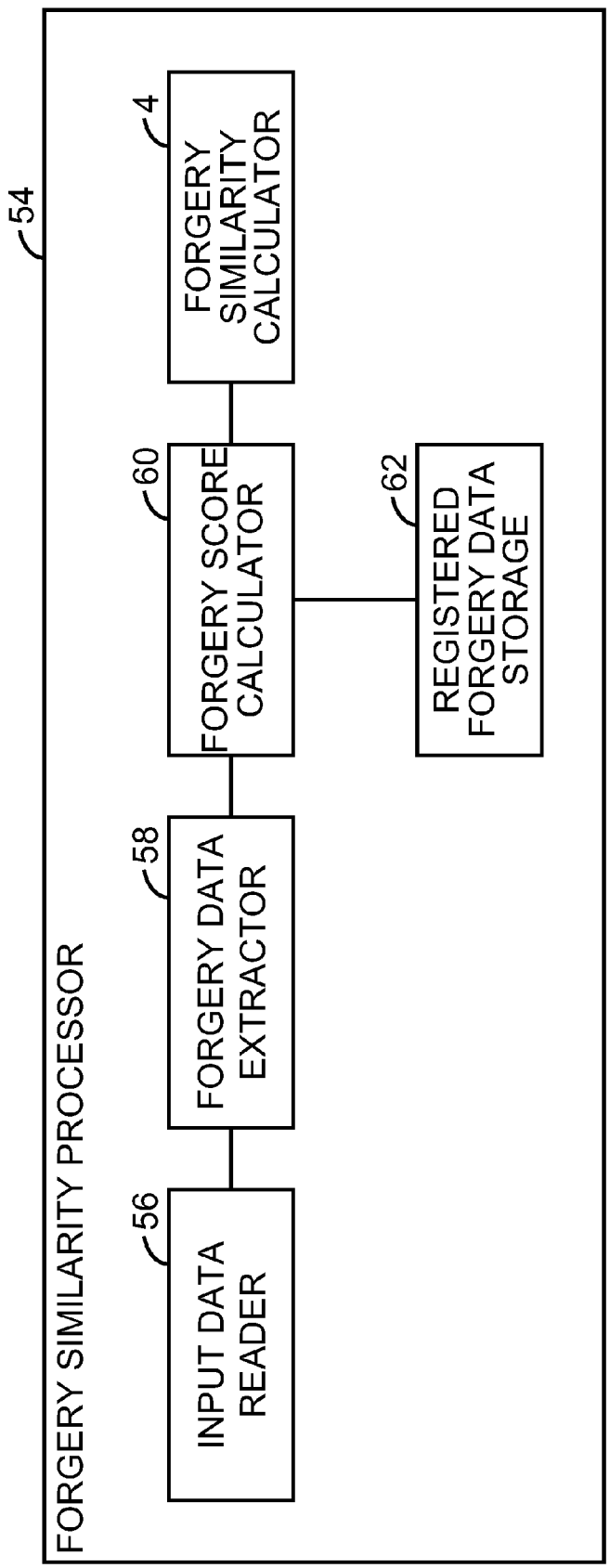
FIG. 21 is a block diagram illustrating a forgery similarity processor according to a third embodiment of the present invention.

FIG. 21 is a block diagram illustrating a forgery similarity processor according to a third embodiment of the present invention. In FIG. 21, like elements are denoted with like reference numerals as in FIG. 1. The configuration illustrated in FIG. 21 is an example, and the present invention is not limited to the configuration illustrated therein.

A forgery similarity processor 54 calculates a forgery similarity on the basis of a forgery score in forgery data extracted at the time of registration. Forgery data is data for determining whether input data belongs to a biologic object or a fake. As illustrated in FIG. 21, the forgery similarity processor 54 includes a input data reader 56, a forgery data extractor 58, a forgery score calculator 60, a registered forgery data storage 62, and a forgery similarity calculator 4.

The input data reader 56 reads biometric data at the time of registration.

The forgery data extractor 58 extracts the forgery data from the biometric data read by the input data reader 56 at the time of registration and inputs the forgery data to a forgery score calculator 60.

The forgery score calculator 60 calculates a forgery score on the basis of forgery data and inputs the calculated forgery score to the forgery similarity calculator 4. The forgery score is used to calculate a forgery similarity.

The registered forgery data storage 62 stores the forgery score calculated by the forgery score calculator 60.

The forgery similarity calculator 4 calculates a forgery similarity by using the above-mentioned method for calculating a forgery similarity (FIGS. 3 and 4) or the calculating method using the forgery similarity conversion table 30 (FIG. 5).

As disclosed above, the forgery similarity may be calculated by extracting the forgery data from the biometric data read at the time of registration and calculating the forgery score.

Figure 22:
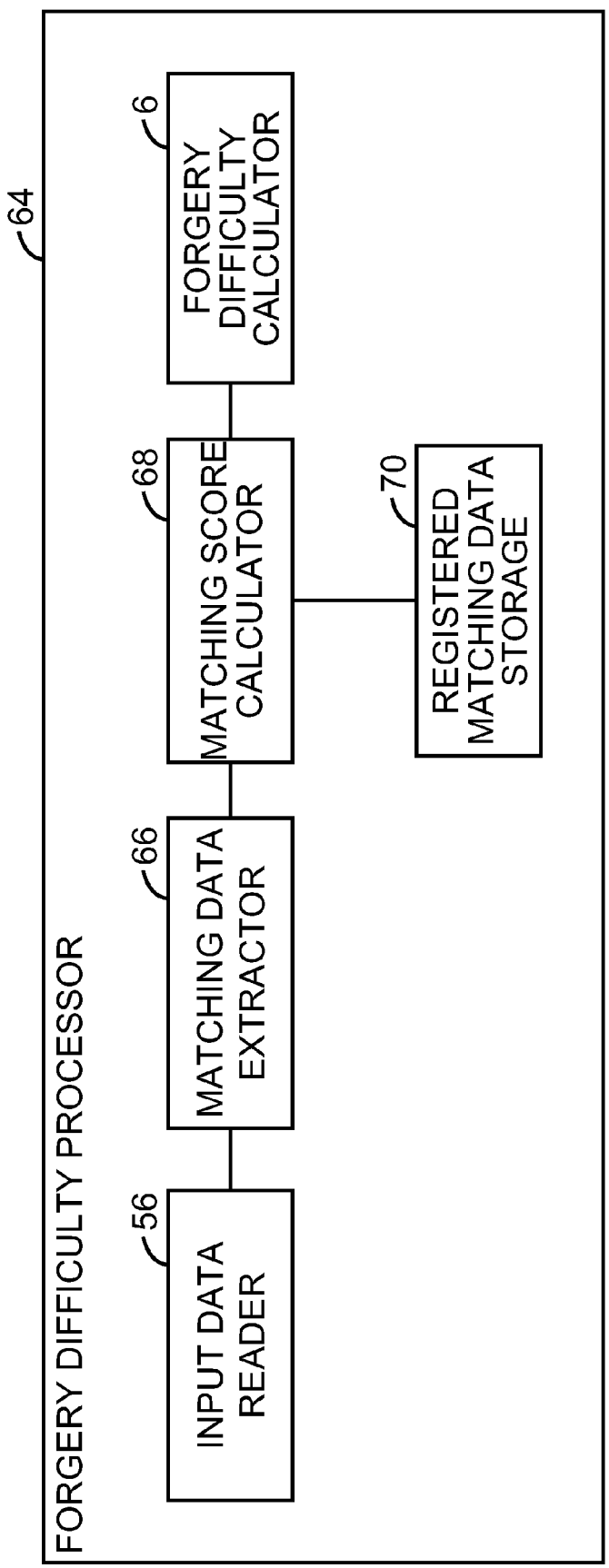
FIG. 22 is a block diagram illustrating a forgery difficulty processor according to a fourth embodiment of the present invention.

FIG. 22 is a block diagram illustrating a forgery difficulty processor according to a fourth embodiment of the present invention. In FIG. 22, like elements are denoted with like reference numerals as in FIGS. 1 and 21. The configuration illustrated in FIG. 22 is an example, and the present invention is not limited to the configuration illustrated therein.

A forgery difficulty processor 64 calculates, at the time of verification, a forgery difficulty used in later verifications. As illustrated in FIG. 22, the forgery difficulty processor 64 includes a input data reader 56, a matching data extractor 66, a matching score calculator 68, a registered matching data storage 70, and a forgery difficulty calculator 6.

The input data reader 56 reads input data at the time of matching.

The matching data extractor 66 extracts matching data from the input data read at the time of matching and inputs the matching data to a matching score calculator 68.

The matching score calculator 68 calculates a matching score on the basis of the matching data extracted at the time of matching, inputs the matching score to the forgery difficulty calculator 6. The matching score is used to calculate a forgery difficulty used in later verifications.

The registered matching data storage 70 stores the matching score calculated by the matching score calculator 68.

The forgery difficulty calculator 6 calculates a forgery difficulty by using the above-mentioned method for calculating a forgery difficulty (FIG. 6) or the calculation method using the forgery difficulty conversion table 32 (FIG. 7).

As disclosed above, the forgery difficulty used in later verifications may be calculated by extracting the matching data from the input data read at the time of verification and calculating the matching score.

Figure 23:
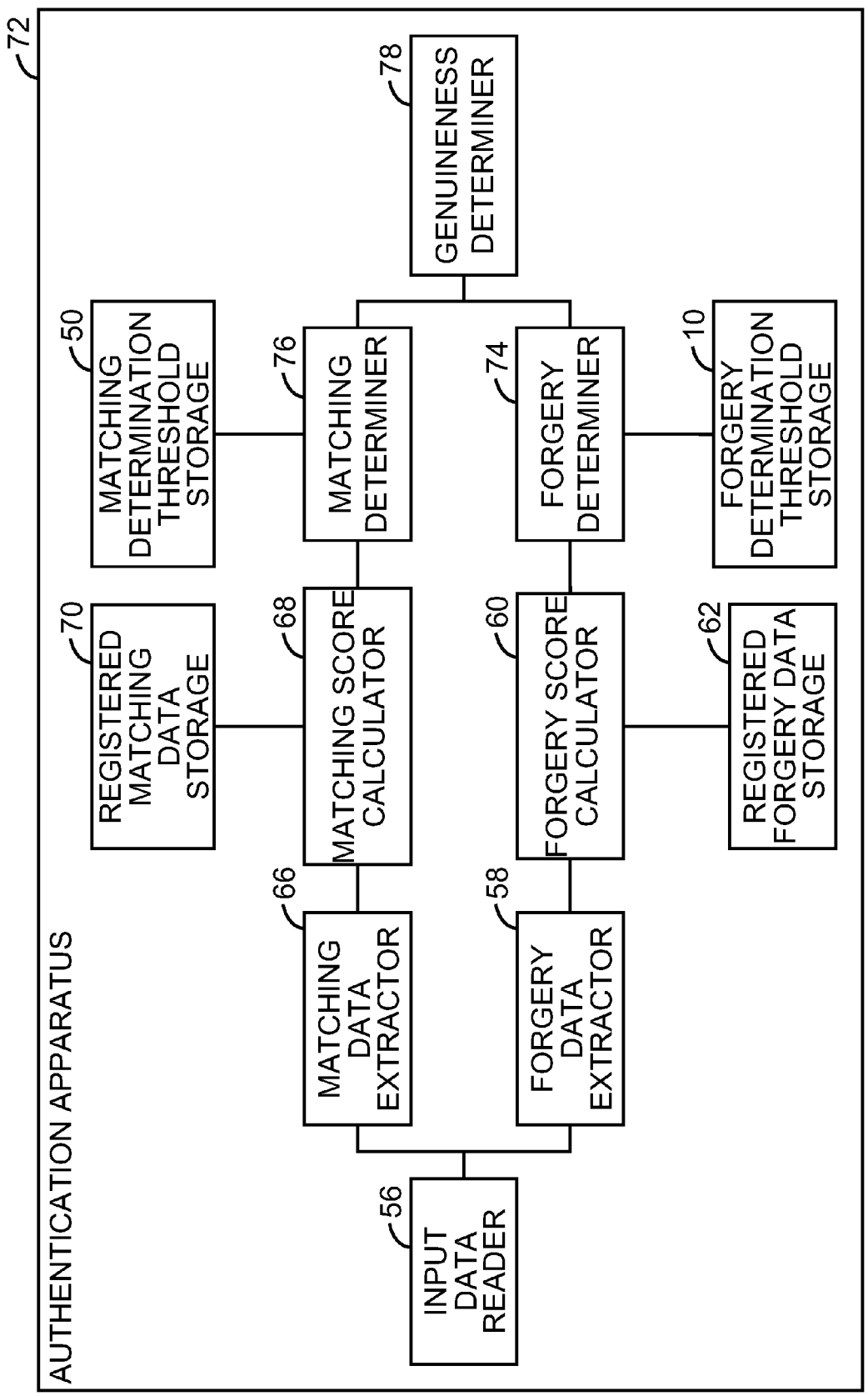
FIG. 23 is a block diagram illustrating an authentication apparatus according to a fifth embodiment of the present invention.

FIG. 23 is a block diagram illustrating an authentication apparatus according to a fifth embodiment of the present invention. In FIG. 23, like elements are denoted with like reference numerals as in FIGS. 1, 21, and 22. The configuration illustrated in FIG. 23 is an example, and the present invention is not limited to the configuration illustrated therein.

An authentication apparatus 72 determines whether taken input data is of a biologic object, and then, determining whether the input data belongs to a genuine person to verify the person. The authentication apparatus 72 sets a forgery determination threshold on the basis of a forgery similarity and a forgery difficulty and determines whether an object under test is a biologic object or not by using the forgery determination threshold to prevent an erroneous determination due to a fake. As illustrated in FIG. 23, the authentication apparatus 72 includes a input data reader 56, a forgery data extractor 58, a forgery score calculator 60, a registered forgery data storage 62, a forgery determiner 74, a forgery determination threshold storage 10, a matching data extractor 66, a matching score calculator 68, a registered matching data storage 70, a matching determiner 76, a matching determination threshold storage 50, and a genuineness determiner 78.

The input data reader 56, the forgery data extractor 58, the forgery score calculator 60, and the registered forgery data storage 62 are similar to those in the third embodiment (FIG. 21). The input data reader 56, the matching data extractor 66, the matching score calculator 68, and the registered matching data storage 70 are similar to those in the fourth embodiment (FIG. 22).

The input data reader 56 reads biometric data such as a fingerprint of a live finger.

The forgery data extractor 58 extracts, from the input data, input forgery data used to determine whether a biologic object or a fake.

The matching data extractor 66 extracts, from the input data, input matching data used for a matching with registered matching data.

The forgery score calculator 60, as disclosed above, calculates a forgery score on the basis of the input forgery data.

Registered forgery data and registered forgery score are stored in the registered forgery data storage 62.

The matching score calculator 68, as disclosed above, calculates the matching score on the basis of the input matching data.

Registered matching data and registered matching score are stored in the registered matching data storage 70.

The forgery determination threshold storage 10, as disclosed above, stores the above-mentioned forgery determination threshold calculated on the basis of the forgery similarity and the forgery difficulty.

A forgery determiner 74 determines whether a fake or not, by comparing the forgery score with the forgery determination threshold.

The matching determination threshold storage 50 stores the above-mentioned matching determination threshold.

A matching determiner 76 determines whether the registered matching data is substantially the same as the input matching data, by comparing the matching score with the matching determination threshold.

A genuineness determiner 78 receives determination results from the forgery determiner 74 and the matching determiner 76, and obtains determination results whether a genuine person or anyone else and whether a biologic object or a fake.

Figure 24:
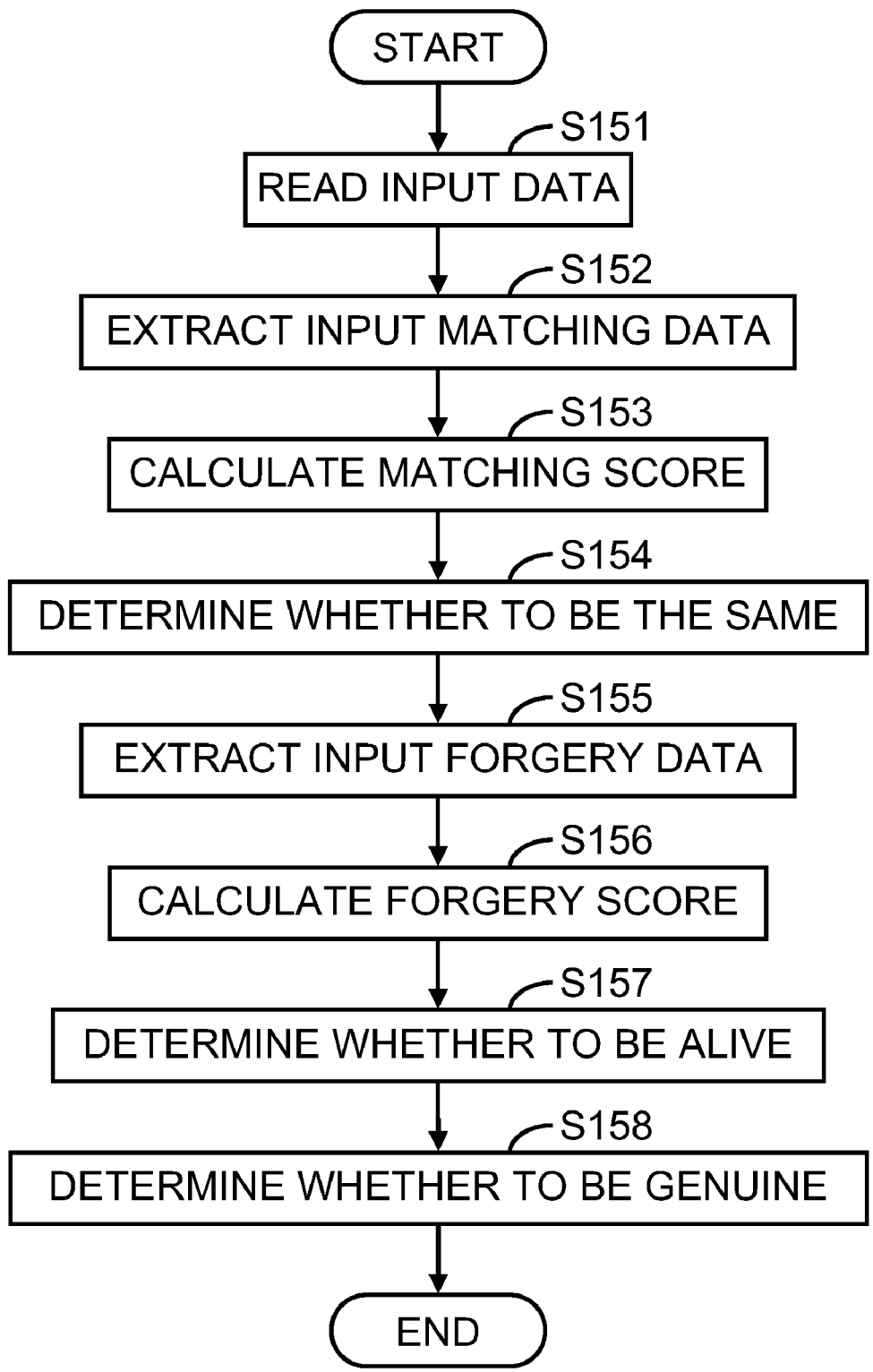
FIG. 24 is a flowchart illustrating a flow of a matching process according to the fifth embodiment of the present invention.
Figure 25:
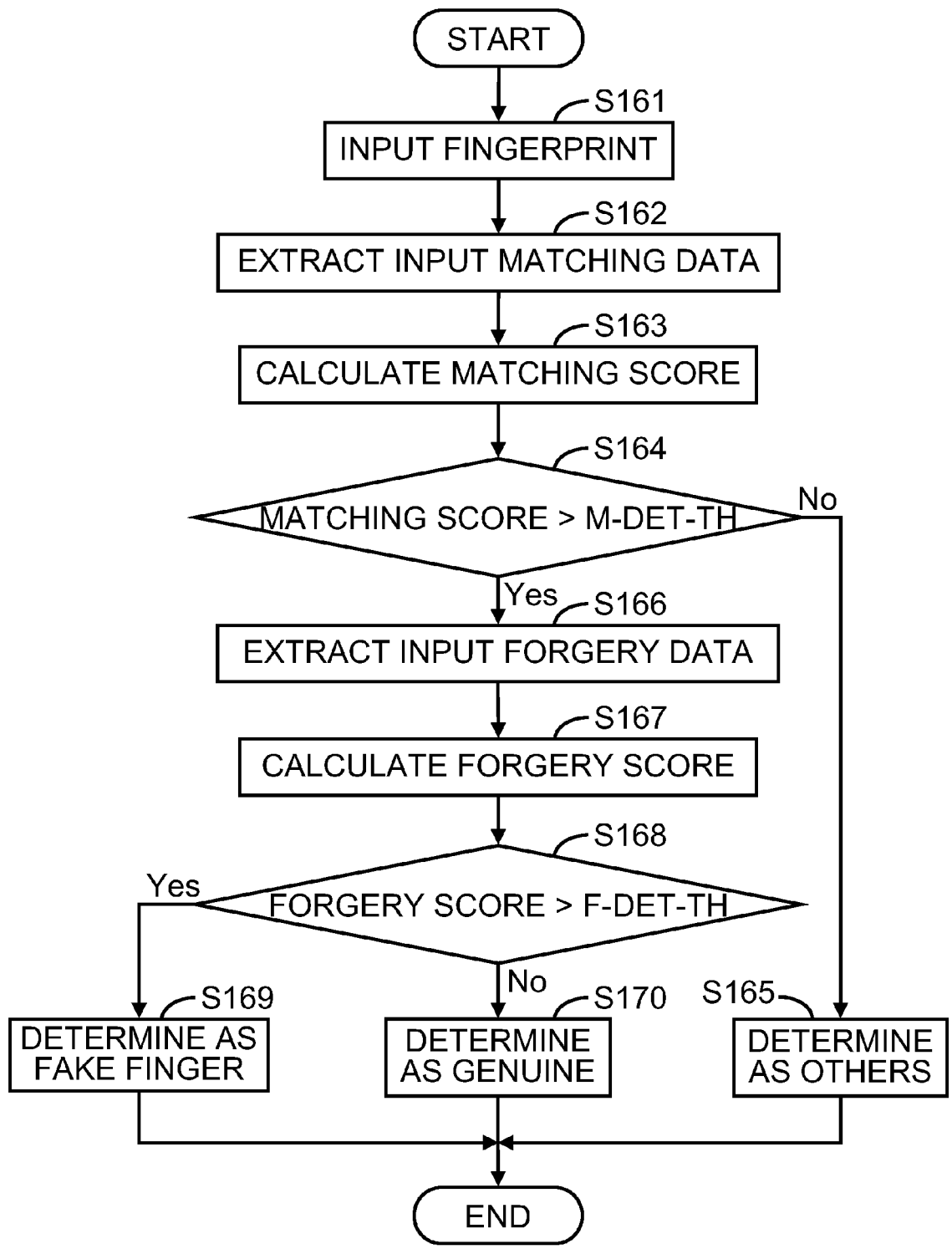
FIG. 25 is a flowchart illustrating a flow of a specific matching process according to the fifth embodiment of the present invention.

In the fifth embodiment, the registered forgery data storage 62 is used. However, in a case where, every time input data is taken in, forgery data is extracted from the input data, a forgery score is calculated, and the forgery score is used for a forgery determination, the data-based registered forgery data storage 62 may not be provided. Alternatively, the registered forgery data storage 62 may be used as storage for temporarily storing the calculated forgery data. FIG. 24 is a flowchart illustrating a flow of a matching process according to the fifth embodiment of the present invention. FIG. 25 is a flowchart illustrating a flow of a specific matching process according to the fifth embodiment of the present invention. In FIG. 25, M-DET-TH and F-DET-TH denote the matching determination threshold and the forgery determination threshold, respectively.

The matching process is an example of determining whether a biologic object or not using the above-mentioned forgery determination threshold calculated on the basis of the forgery similarity and the forgery difficulty in an authentication method.

In operation S151, the input data reader 56 reads input data.

In operation S152, the matching data extractor 66 extracts input matching data from the input data.

In operation S153, the matching score calculator 68 calculates a matching score on the basis of the input matching data.

In operation S154, the matching determiner 76 determines whether the input matching data is substantially the same as the registered matching data.

In operation S155, the forgery data extractor 58 extracts input forgery data from the input data.

In operation S156, the forgery score calculator 60 calculates a forgery score on the basis of the input forgery data.

In operation S157, the forgery determiner 74 determines whether a biologic object or not.

In operation S158, the forgery determiner 74 determines whether the genuine person or not. Then, the matching process is finished.

In such a case, the genuineness determiner 78 determines the person being verified is the genuine person when the forgery determiner 74 determines as the genuine person, that is, a biologic object, and the matching determiner 76 determines that the both data are substantially the same.

In operation S157 of the matching process, the forgery determination threshold is used in the determination. The forgery determination threshold is obtained through the above-mentioned process. The matching determination threshold Ath (FIG. 6) may be calculated on the basis of a matching score.

In the calculation of the forgery score, in a case of a slide-type fingerprint authentication, the forgery score is discriminated on the basis of a difference between sliding speeds of the finger at the time of registration and at the time of authentication, on the basis of a difference between impedance values at the time of registration and at the time of authentication, and on the basis of a difference between pressures of the finger at the time of registration and at the time of authentication.

As for the matching process, in a case where fingerprint data is used as the biometric data, a forgery score, a forgery determination threshold, a matching score, and a matching determination threshold are explicitly provided in FIG. 25.

In operation S161, the input data reader 56 takes in an input of fingerprint data.

In operation S162, the matching data extractor 66 extracts input matching data from the fingerprint data.

In operation S163, the matching score calculator 68 calculates a matching score on the basis of the input matching data.

In operation S164, the matching determiner 76 compares the matching score with the matching determination threshold to determine whether the matching score is higher than the matching determination threshold.

In operation S165, when the matching score is not higher than the matching determination threshold (operation S164: No), that is, the matching score is lower than or equal to the matching determination threshold (matching score≦M-DET-TH), the genuineness determiner 78 determines that the person being verified is anyone else, and the matching process is finished.

In operation S166, when the matching score is higher than the matching determination threshold (operation S164: Yes), the forgery data extractor 58 extracts input forgery data from the fingerprint data.

In operation S167, the forgery score calculator 60 calculates a forgery score on the basis of the input forgery data.

In operation S168, the forgery determiner 74 compares the forgery score with a forgery determination threshold to determine whether the forgery score is higher than the forgery determination threshold.

In operation S169, when the forgery score is higher than the forgery determination threshold (operation S164: Yes), the genuineness determiner 78 determines as a fake finger, and the matching process is finished.

In operation S170, when the forgery score is not higher than the forgery determination threshold (operation S168: No), that is, the forgery score is lower than or equal to the forgery determination threshold (forgery score≦F-DET-TH), the genuineness determiner 78 determines that the person being verified is the genuine person, and the matching process is finished.

In the matching process, the matching determination threshold is set on the basis of the forgery similarity and the forgery difficulty together with the forgery determination threshold. Through the process, it is possible to reduce the possibility that the biologic object is erroneously determined as a fake without increasing the risk in authentication with a fake. The matching determination threshold is a threshold used to determine whether a matching score between input matching data and registered matching data indicates sameness. To make a fake finger that may obtain a high matching score or to input data that may obtain a high matching score, a high technology may be required. Accordingly, by setting a high matching determination threshold, it is possible to reduce the risk in false acceptance due to a fake finger. For example, in a case of input data that has a high forgery similarity (similar to a fake), and a low forgery difficulty (easy to impersonate with the fake), if the forgery determination threshold is set to a large value, the input data may easily be determined as belonging to a fake. On the other hand, if the forgery determination threshold is set to a small value, the authentication with a fake becomes easier. In such a case, by setting the forgery determination threshold to a small value and setting the matching determination threshold to a large value, it is possible to reduce possibility that the biologic object is erroneously determined as a fake without increasing the risk in the false acceptance due to a fake. Accordingly, while security is maintained, the increase in false rejection due to the forgery detection may be reduced.

Figure 26:
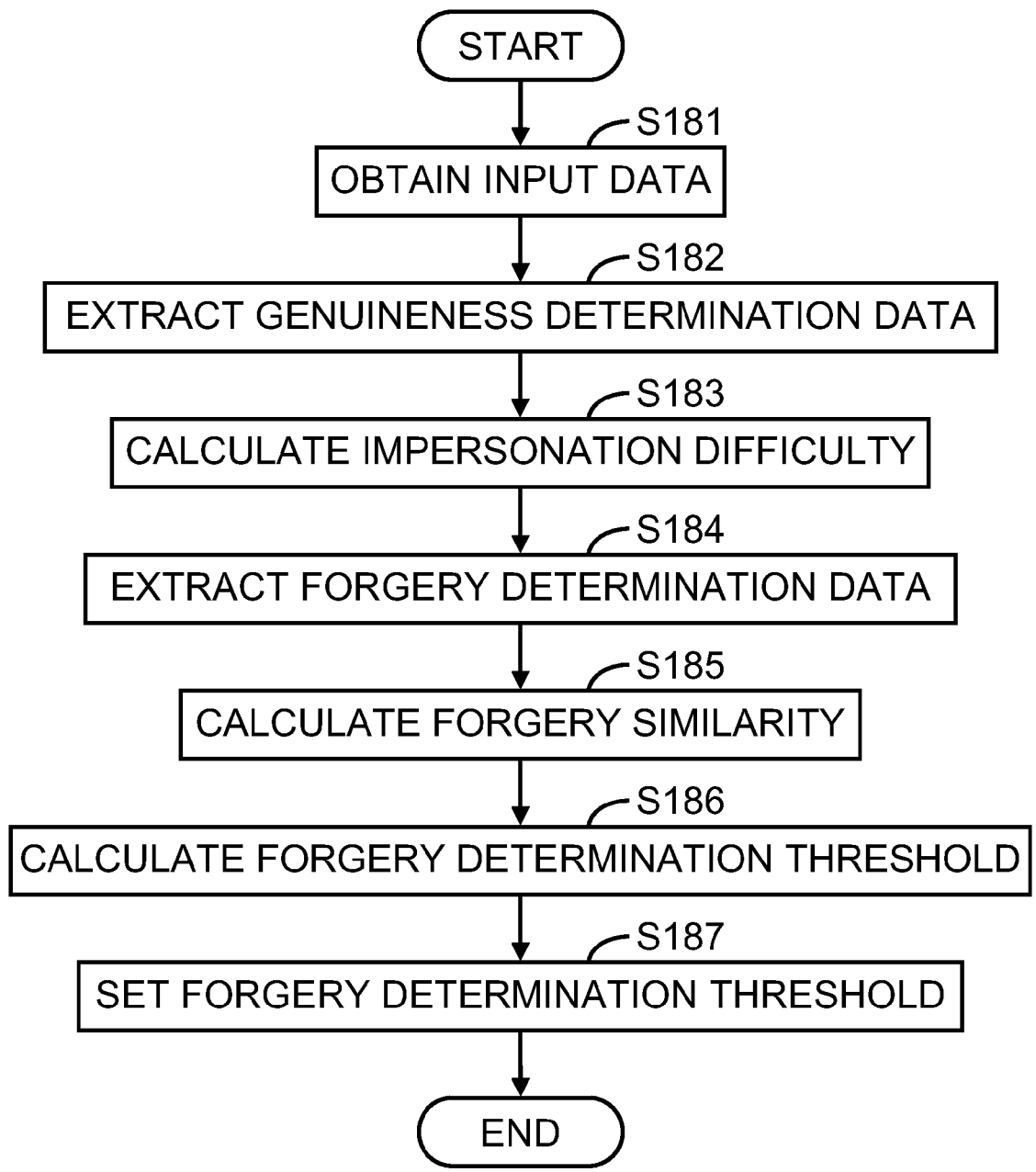
FIG. 26 is a flowchart illustrating a flow of a process for setting a forgery determination threshold according to a sixth embodiment of the present invention.

FIG. 26 is a flowchart illustrating a flow of a process for setting a forgery determination threshold according to a sixth embodiment of the present invention. The configuration illustrated in FIG. 26 is an example, and the present invention is not limited to the configuration illustrated therein.

The process illustrated in FIG. 26 for setting a forgery determination threshold is an example of calculating a forgery determination threshold on the basis of a forgery similarity in an authentication method.

In operation S181, input data is obtained.

In operation S182, genuineness determination data is extracted from the input data.

In operation S183, an impersonation difficulty (forgery difficulty) is calculated on the basis of the genuineness determination data. The method for calculating the forgery difficulty has been disclosed above.

In operation S184, forgery determination data is extracted from the input data.

In operation S185, a forgery similarity is calculated on the basis of the forgery determination data. The method for calculating the forgery similarity has been disclosed above.

In operation S186, a forgery determination threshold is calculated on the basis of the impersonation difficulty (forgery difficulty) and the forgery similarity.

In operation S187, the calculated forgery determination threshold is set, and the process for calculating and setting the forgery determination threshold is finished. The forgery determination threshold is used as the forgery determination threshold in operation S168 of the above-mentioned flowchart (FIG. 25). Using the forgery determination threshold, it is possible to determine whether the input data belongs to a fake or a biologic object.

Figure 27:
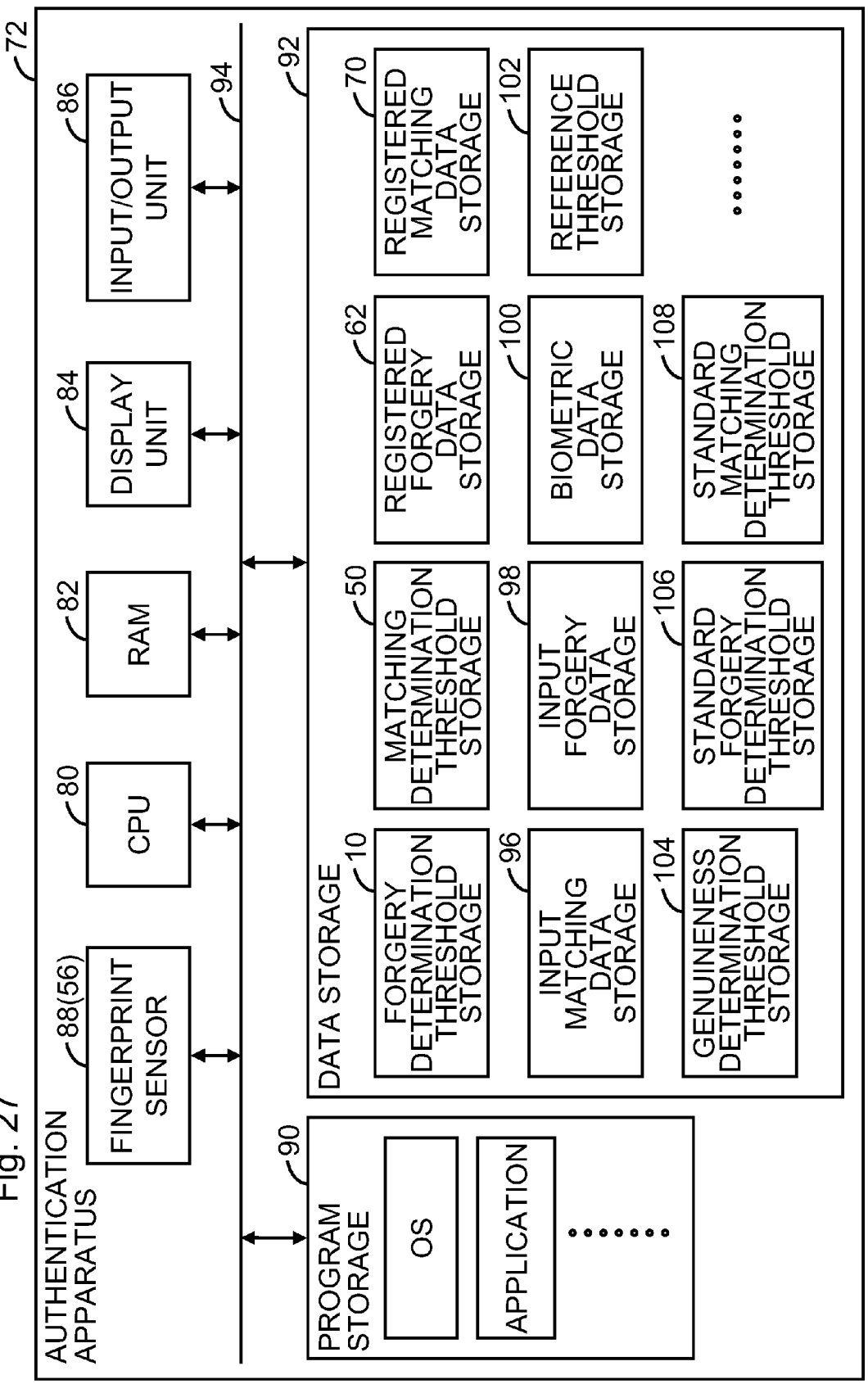
FIG. 27 is a diagram illustrating a hardware configuration of an authentication apparatus according to a seventh embodiment of the present invention.

FIG. 27 is a diagram illustrating a hardware configuration of an authentication apparatus according to a seventh embodiment of the present invention. In FIG. 27, like elements are denoted with like reference numerals as in FIGS. 1, 9, 14, 18, 21, 22, and 23. The configuration illustrated in FIG. 27 is an example, and the present invention is not limited to the configuration illustrated therein.

The authentication apparatus 72 includes a computer as information processor. Similarly, any one or all of the threshold setter 2 (FIGS. 1, 9, and 14) according to the first embodiment, the threshold setter 2 (FIG. 18) according to the second embodiment, the forgery similarity processor 54 (FIG. 21) according to the third embodiment, the forgery difficulty processor 64 (FIG. 22) according to the fourth embodiment, and the authentication apparatus 72 (FIG. 23) according to the fifth embodiment may be formed using the computer.

The authentication apparatus 72 includes a central processing unit (CPU) 80, a random-access memory (RAM) 82, a display unit 84, an input/output unit 86, a fingerprint sensor 88, a program storage 90, and a data storage 92. These elements are connected each other via a bus 94.

The CPU 80 controls processes for reading input data, calculating and setting a forgery determination threshold, storing various data, performing calculation, or the like by executing an operating system (OS) and application programs such as an authentication program. The CPU 80 forms the above-mentioned threshold setter 2, the forgery similarity processor 54, the forgery difficulty processor 64, or the like.

The RAM 82 is a work area. The display unit 84 presents information, and for example, formed by a liquid crystal display (LCD). The input/output unit 86 is used to input and output data, or the like, and to input data, a keyboard or the like is used.

The fingerprint sensor 88 inputs input data for fingerprint data as biometric data. The fingerprint sensor 88 is an example of the above-mentioned input data reader 56. The fingerprint sensor 88 may input a finger image by sliding a live finger.

The program storage 90 records a program. The program storage 90 is formed by a computer-readable/writable recording medium. The program storage 90 stores an OS, the above-mentioned authentication program as an application program, a forgery threshold setting routine, or the like.

The data storage 92 stores data. As the data storage 92, the above-mentioned forgery determination threshold storage 10, the matching determination threshold storage 50, the registered forgery data storage 62, the registered matching data storage 70, an input matching data storage 96, an input forgery data storage 98, an biometric data storage 100, a reference threshold storage 102, a genuineness determination threshold storage 104, a standard forgery determination threshold storage 106, a standard matching determination threshold storage 108, or the like may be set. It is noted that all of the units may be set, or, necessary data storages may be set depending on the cases in the above-mentioned embodiments.

Figure 28:
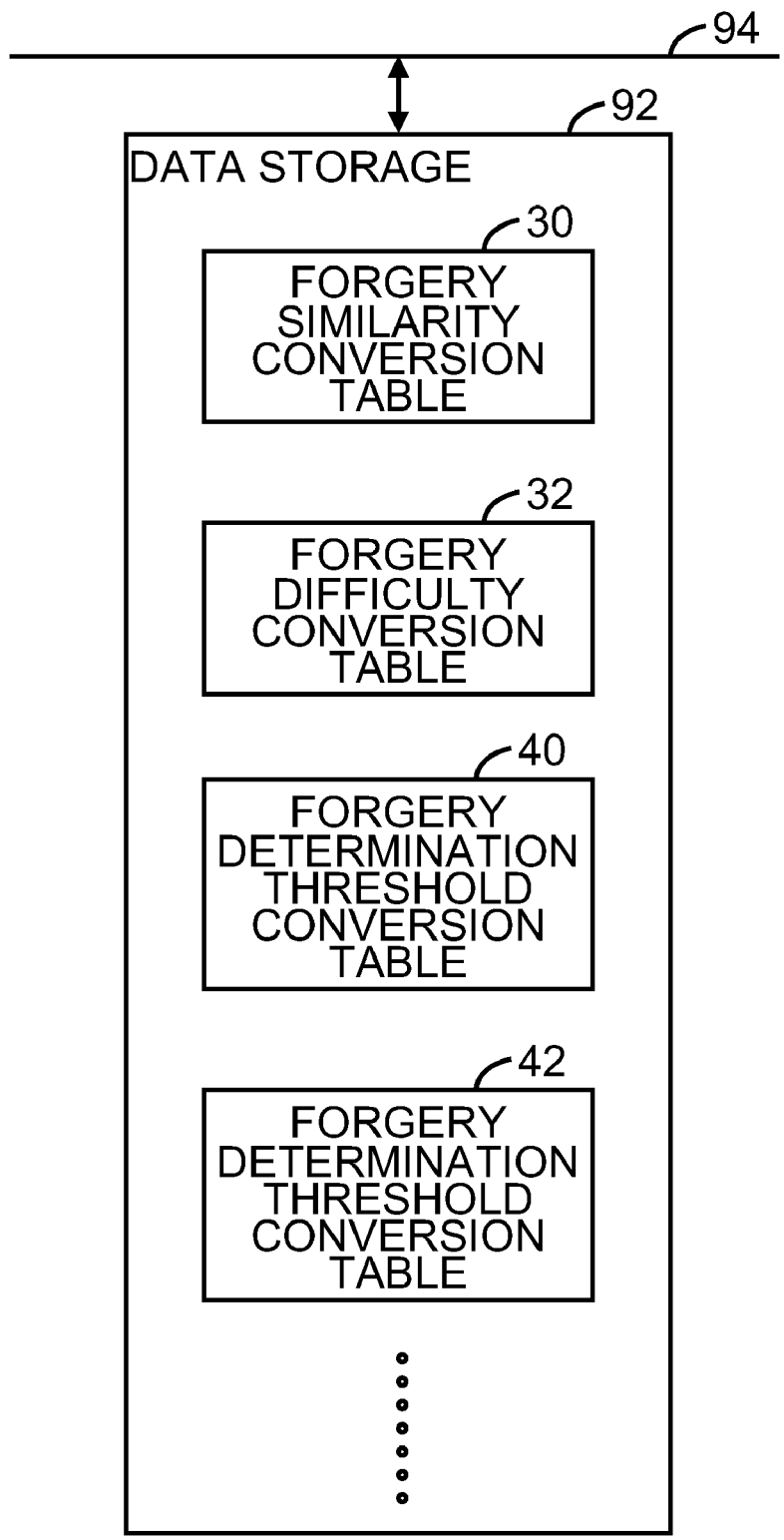
FIG. 28 is a diagram illustrating a variant of a data storage in an authentication apparatus according to the seventh embodiment of the present invention.

FIG. 28 is a diagram illustrating a variant of a data storage in an authentication apparatus according to the seventh embodiment of the present invention. The data storage 92 may include, as illustrated in FIG. 28, the forgery similarity conversion table 30 (FIG. 5), the forgery difficulty conversion table 32 (FIG. 7), the forgery determination threshold conversion table 40 (FIG. 13), the forgery determination threshold conversion table 42 (FIG. 17), or the like. It is noted that all of the data tables may be set, or any of the data tables may be selected and set.

The authentication apparatus 72, by using the forgery determination threshold calculated on the basis of the forgery similarity and the forgery difficulty, may increase the accuracy in determining whether a biologic object or a fake and reduce the false rejection due to an erroneous determination in the forgery determination of a biologic object that has a feature similar to a fake.

Features in Each Embodiment and Other Embodiments (1) In the embodiments disclosed above, fingerprint data has been disclosed as biometric data. However, in the present invention, biometric data other than the fingerprint data, such as vein data and iris data, may be used. Accordingly, the authentication apparatus may be configured as a biometric authentication apparatus, a fingerprint authentication apparatus, or the like.

(2) In the forgery similarity calculation method in the forgery similarity calculator, a forgery similarity is calculated on the basis of a forgery score obtained from biometric data input at the time of registration. For example, in a case where the forgery score at the time of registration is high, the forgery similarity is calculated to be a large value (characteristics in the biometric data is similar to a fake).

(3) In a case where biometric data is input a plurality of times at the time of registration, by calculating a forgery similarity on the basis of the plurality of forgery scores, a more stable result may be obtained. For example, an average or an intermediate value of a plurality of forgery scores may be used.

(4) A forgery similarity is calculated on the basis of a forgery score obtained from input data at previous time of matching. In the calculation, by using only a forgery score having a matching score higher than or equal to a predetermined threshold, it is possible to prevent that biometric data includes biometric data that belongs to a person other than the genuine person. By calculating a forgery similarity on the basis of forgery scores of a plurality of times in the past, a more stable result may be obtained. For example, an average or an intermediate value of a plurality of forgery scores may be used. In such a case, to calculate the forgery similarity, for example, a conversion table based on an experimental result may be provided in advance, and using the table, the forgery similarity may be calculated.

(5) The above-mentioned calculation of a matching score (similarity) is not limited to the above-mentioned calculation method, but known methods may be used.

(6) In the fingerprint authentication, a matching score (similarity) is calculated, and depending on whether the matching score is higher than or equal to a matching determination threshold, it is determined whether the fingerprint belongs to a genuine person or not. In such a case, as the data for matching, other than the minutia data, pattern data, or the like may be used.

(7) An example of the minutia matching algorithm is a method of calculating the number of matched minutiae between minutiae in registered matching data and minutiae in input matching data and calculating a matching score on the basis of a ratio of the number of matched minutiae. To increase the matching accuracy, types (ridge ending, bifurcation, etc.) of minutiae, features of fingerprint ridges between minutiae, or the like may be used. Further, as an example of the pattern matching algorithm, a matching score may be calculated on the basis of a ratio of a matched image area between a binary image of registered matching data and a binary image of input matching data.

(8) In the forgery difficulty calculation in the above-mentioned forgery difficulty calculator, a forgery difficulty is calculated on the basis of a matching determination threshold used in the determination in the matching determiner. That is, since it is difficult to make a fake that may obtain a high matching score, if the matching determination threshold is set to a large value, irrespective of forgery determination thresholds, the matching using a fake is difficult. Accordingly, if the forgery determination threshold is set to a small value, a difficulty in impersonation with a fake may be maintained. Further, a forgery difficulty may be calculated on the basis of a matching score calculated by the matching score calculator. In a case where a high matching score is calculated, a possibility in authentication with a fake becomes low.

(9) A forgery difficulty may be calculated on the basis of state data in biometric data obtained at the time of registration or a matching. In the fingerprint authentication, the forgery difficulty may be calculated on the basis of unsharpness of fingerprint ridges. It is difficult to forge the state when a state of a finger is bad, for example, fingerprint ridges are blurred. In such a case, even if a forgery determination threshold is set to a small value, a difficulty in impersonation with a fake may be maintained. As the unsharpness of fingerprint ridges, for example, information that there are many crushed areas (areas where widths of fingerprint ridges are wider than a normal fingerprint ridge) in the fingerprint image, information that there are many parts determined as a "ridge break" at the time of matching data extraction, information that there are many areas where boundaries between ridge lines and valley lines are unclear (changes in image gradation is gentle), or the like may be used. Further, the forgery difficulty may be calculated on the basis of a state of dryness of finger skin.

(10) In a case where a fake finger is detected on the basis of an electric characteristic, because, generally, characteristics of a wet finger and a fake finger are similar to each other, if a state of finger skin is "dry", it is difficult to forge the state. Accordingly, even if a forgery determination threshold is set to a small value, a difficulty in impersonation with a fake may be maintained. In such a case, whether the state of the finger skin is "dry" or not may be calculated, for example, by calculating a forgery difficulty by combining a sensitivity of a capacitance type fingerprint sensor at the time of image capturing and a density of the image captured by the capacitance type fingerprint sensor. In such a case, similarly to the forgery similarity, a conversion table may be used to calculate the forgery difficulty.

Figure 29:
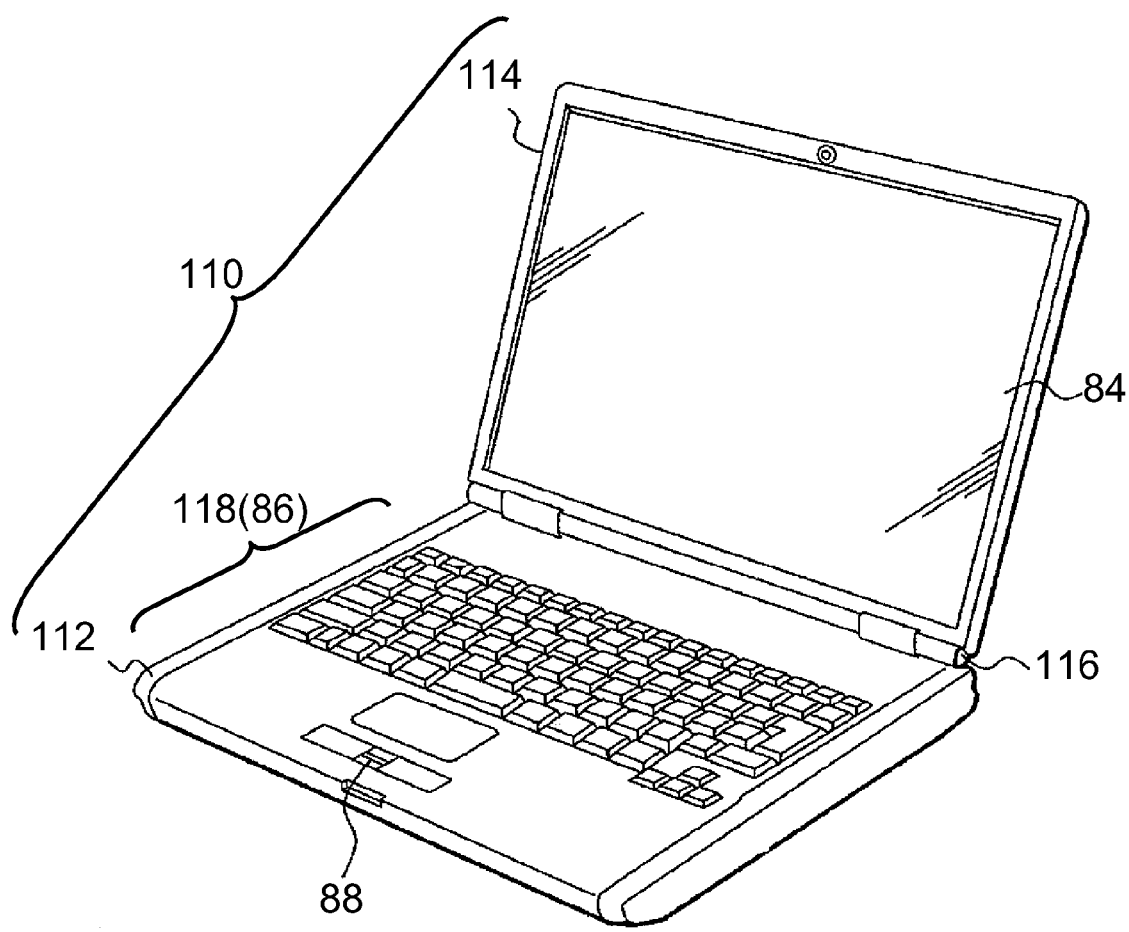
FIG. 29 is a diagram illustrating an example of a personal computer.
Figure 30:
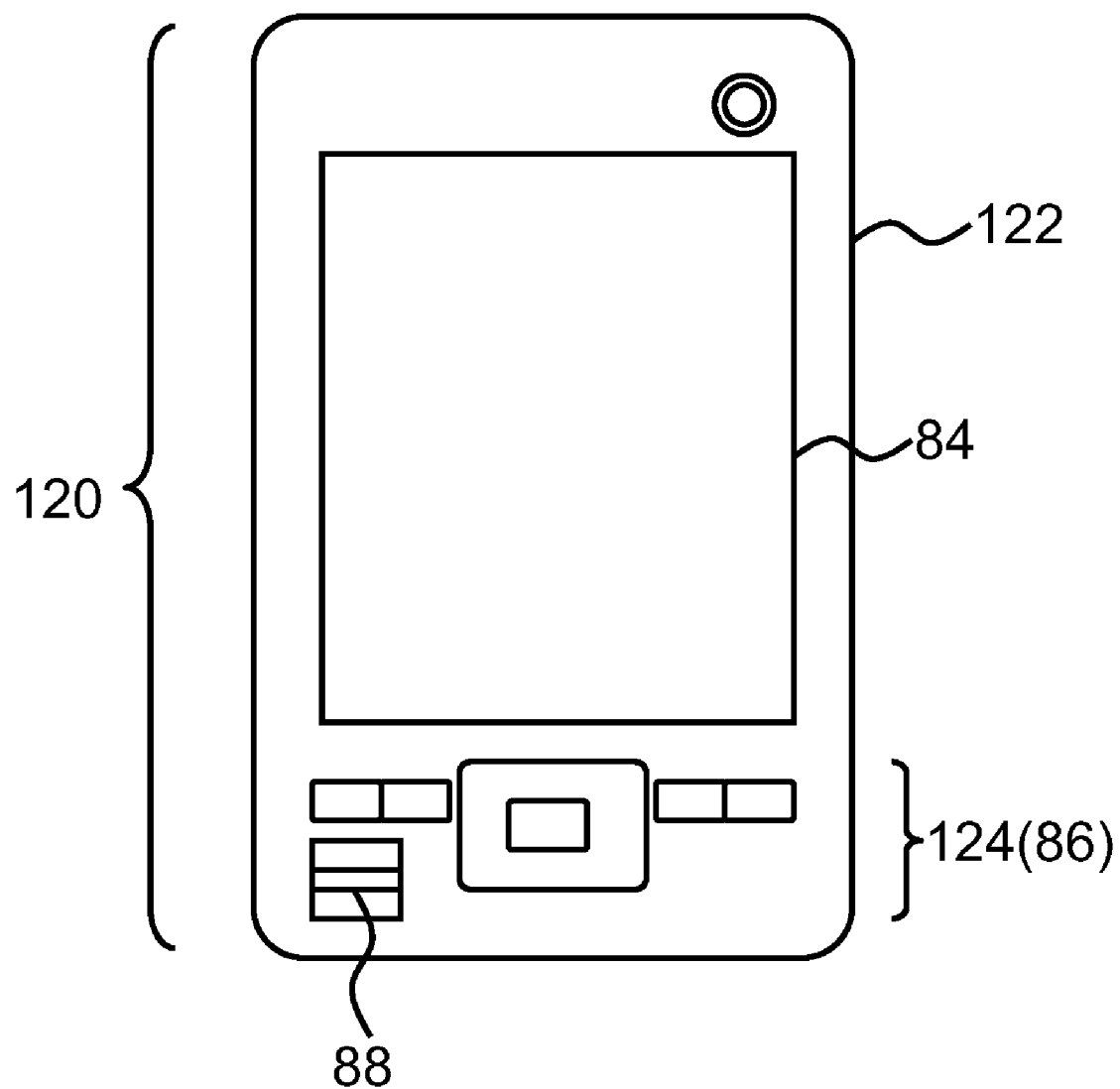
FIG. 30 is a diagram illustrating an example of a personal digital assistant.
Figure 31:
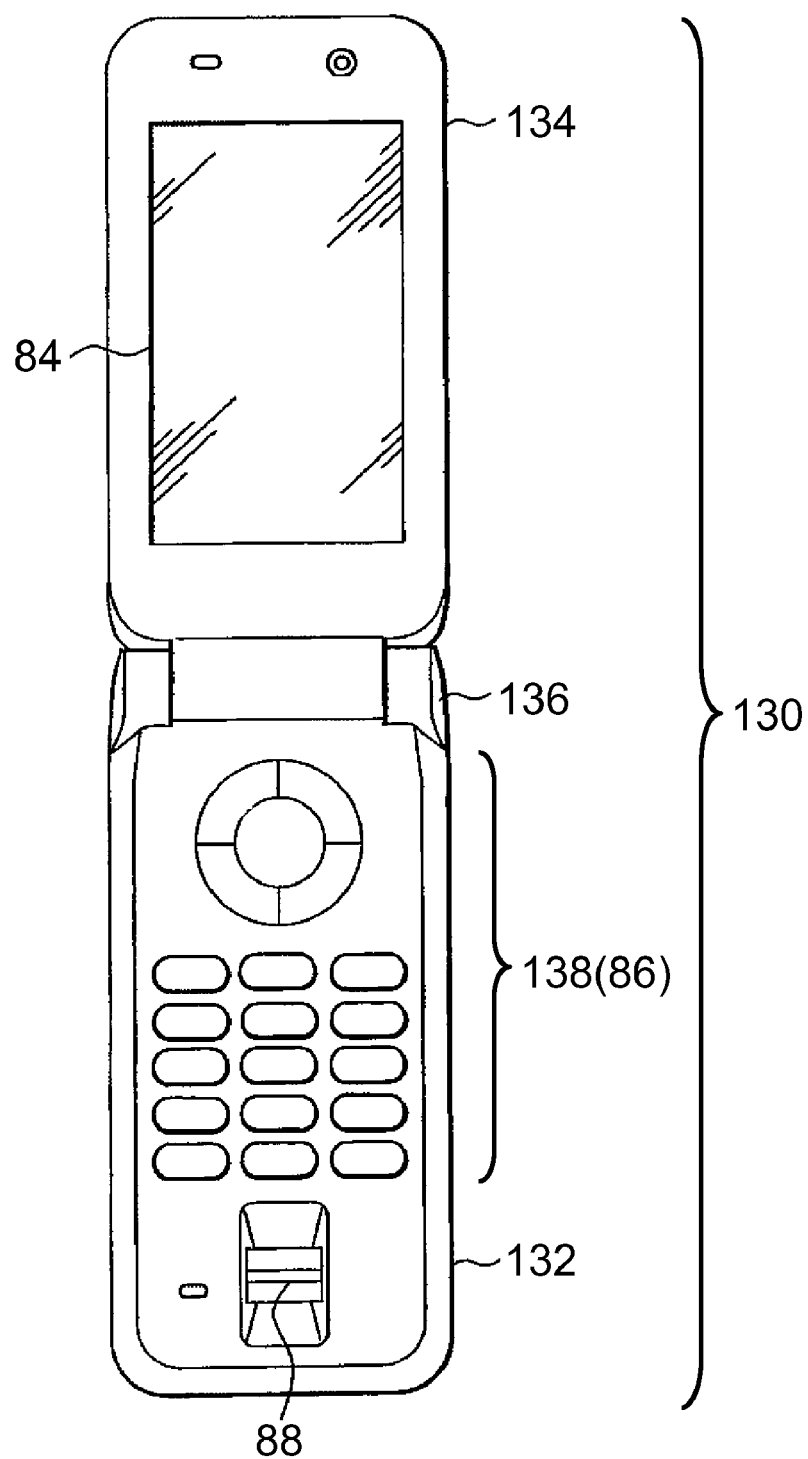
FIG. 31 is a diagram illustrating an example of a cell phone.

FIG. 29 is a diagram illustrating an example of a personal computer (PC). FIG. 30 is a diagram illustrating an example of a personal digital assistant (PDA). FIG. 31 is a diagram illustrating an example of a cell phone. In FIGS. 29 to 31, like elements are denoted with like reference numerals as in FIG. 27.

A PC 110 illustrated in FIG. 29 is an example of an electronic device that is provided with the authentication apparatus 72 (FIG. 27). As illustrated in FIG. 29, a housing 112 and a housing 114 are configured to be openable and closable at a hinge 116. On the housing 112, a keyboard 118 is provided, and a fingerprint sensor 88 is provided as the input data reader. On the housing 114, a display 84 is provided.

In such a configuration, a forgery difficulty and a forgery similarity are calculated on the basis of fingerprint data taken from the fingerprint sensor 88. A forgery determination threshold is set on the basis of the forgery difficulty and forgery similarity. Thus, as disclosed above, the accuracy in determining whether a biologic object or a fake may be increased, and the false rejection due to an erroneous determination of a biologic object that has a characteristic similar to a fake may be reduced. Accordingly, a PC that may perform highly reliable authentication may be provided.

A PDA 120 illustrated in FIG. 30 is an example of an electronic device that is provided with the authentication apparatus 72 (FIG. 27). As illustrated in FIG. 30, an input unit 124, and the fingerprint sensor 88 as the input data reader are provided on a housing 122. Further, on the housing 122, the display 84 is provided.

In such a configuration, similarly, the false rejection due to an erroneous determination of a biologic object that has a characteristic similar to a fake may be reduced. Accordingly, a PDA that may perform highly reliable authentication may be realized.

A portable device 130 illustrated in FIG. 31 is an example of an electronic device that is provided with the authentication apparatus 72 (FIG. 27). As illustrated in FIG. 31, a housing 132 and a housing 134 are configured to be openable and closable at a hinge 136. On the housing 132, a keyboard 138 is provided, and the fingerprint sensor 88 is provided as the input data reader. On the housing 134, the display 84 is provided.

In such a configuration, similarly, the false rejection due to an erroneous determination of a biologic object that has a characteristic similar to a fake may be reduced. Accordingly, a portable device such as a cell phone that may perform highly reliable authentication may be realized.

The embodiments of the present invention have been disclosed above. However, the present invention is not limited to the above descriptions, but numerous variations and modifications may be made by those skilled in the art without departing from the scope of the present invention described in the claims or disclosed in the embodiments. It is to be understood that such variations and modifications are included in the spirit and scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An authentication apparatus for authenticating a person by determining whether input data belongs to a biologic object in accordance with a predefined condition based on biometric data of a genuine person and whether the input data matches with registered biometric data of the genuine person, said authentication apparatus comprising:
   a forgery data extractor configured to extract forgery data from the input data, said forgery data being for determining whether the input data belongs to a biologic object or a fake;
   a forgery similarity calculator configured to calculate forgery similarity of biometric data of the genuine person, said forgery similarity indicating similarity to a fake;
   a forgery difficulty calculator configured to calculate forgery difficulty of biometric data of the genuine person, said forgery difficulty indicating difficulty of forgery;
   a determination threshold setter configured to determine a forgery determination threshold on the basis of the forgery similarity and the forgery difficulty;
   a forgery score calculator configured to calculate a forgery score of the input data on the basis of extracted forgery data, said forgery score indicating likelihood of forgery; and
   a forgery determiner configured to determine whether the input data belongs to a biologic object by comparing calculated forgery score with the forgery determination threshold.

2. The authentication apparatus of claim 1, further comprising:
   a matching data extractor configured to extract matching data from the input data, said matching data being for determining whether the input data belongs to a genuine person;
   a matching score calculator configured to calculate a matching score by matching extracted matching data with registered matching data when the forgery determiner has determined that the input data belongs to a biologic object, said matching score indicating a degree of coincidence between the extracted matching data and the registered matching data; and
   a matching determiner configured to determine whether the extracted matching data matches with the registered matching data by comparing calculated matching score with a matching determination threshold.

3. The authentication apparatus of claim 2, further comprising:
   a genuineness determiner configured to determine whether the input data belongs to the genuine person on the basis of determination result from the forgery determiner and determination result from the matching determiner.

4. The authentication apparatus of claim 1, further comprising:
   a forgery data storage configured to store registered forgery data,
   wherein
   said forgery score calculator calculates the forgery score on the basis of, in addition to the extracted forgery data, the registered forgery data stored in the forgery data storage.

5. The authentication apparatus of claim 1, wherein said determination threshold setter
   sets a standard forgery determination threshold as the forgery determination threshold when the forgery similarity is lower than a predefined reference threshold,
   calculates, when the forgery similarity is higher than or equal to the predefined reference threshold, on the basis of the forgery difficulty, a forgery determination threshold with which difficulty in impersonation with a fake may be maintained,
   sets a calculated forgery determination threshold as the forgery determination threshold when the calculated forgery determination threshold is lower than the standard forgery determination threshold, and
   sets the standard forgery determination threshold as the forgery determination threshold when the calculated forgery determination threshold is higher than or equal to the standard forgery determination threshold.

6. The authentication apparatus of claim 1, wherein said determination threshold setter
   sets a standard forgery determination threshold as the forgery determination threshold when the forgery difficulty is higher than a predefined reference threshold, calculates, when the forgery difficulty is lower than or equal to the predefined reference threshold, on the basis of the forgery similarity, a forgery determination threshold with which difficulty in erroneous determination as a fake may be maintained, sets a calculated forgery determination threshold as the forgery determination threshold when the calculated forgery determination threshold is higher than or equal to the standard forgery determination threshold, and sets the standard forgery determination threshold as the forgery determination threshold when the calculated forgery determination threshold is lower than the standard forgery determination threshold.

7. The authentication apparatus of claim 2, wherein said determination threshold setter further determines the matching determination threshold on the basis of the forgery similarity and the forgery difficulty.

8. The authentication apparatus of claim 7, wherein said determination threshold setter sets a standard forgery determination threshold and a standard matching determination threshold as the forgery determination threshold and the matching determination threshold, respectively, when the forgery similarity is lower than a predefined first reference threshold and the forgery difficulty is higher than a predefined second reference threshold, calculates, on the basis of the forgery similarity, a forgery determination threshold with which difficulty in erroneous determination as a fake may be maintained when the forgery similarity is higher than or equal to the predefined first reference threshold or the forgery difficulty is lower than or equal to the predefined second reference threshold, sets a calculated forgery determination threshold and the standard matching determination threshold as the forgery determination threshold and the matching determination threshold, respectively, when difficulty in impersonation with a fake may be maintained with the calculated forgery determination threshold, calculates a matching determination threshold that may maintain difficulty in impersonation with a fake when difficulty in impersonation with a fake may not be maintained with the calculated forgery determination threshold, sets the calculated forgery determination threshold and the standard matching determination threshold as the forgery determination threshold and the matching determination threshold, respectively, when a calculated matching determination threshold is lower than the standard matching determination threshold, and sets the calculated forgery determination threshold and the calculated matching determination threshold as the forgery determination threshold and the matching determination threshold, respectively, when the calculated matching determination threshold is higher than or equal to the standard matching determination threshold.

9. The authentication apparatus of claim 1, wherein said forgery similarity calculator calculates, at registration of biometric data of the genuine person, forgery similarity of biometric data of the genuine person on the basis of a forgery score of the registered biometric data.

10. The authentication apparatus of claim 1, wherein said forgery similarity calculator calculates, at registration of biometric data of the genuine person, forgery similarity of biometric data of the genuine person on the basis of an average value of forgery scores of a plurality of registered biometric data.

11. The authentication apparatus of claim 2, wherein said forgery similarity calculator calculates forgery similarity of biometric data of the genuine person on the basis of a forgery score of previous input data of the genuine person, a matching score of said previous input data being higher than or equal to a predefined matching threshold.

12. The authentication apparatus of claim 2, wherein said forgery similarity calculator calculates forgery similarity of biometric data of the genuine person on the basis of an average value of forgery scores of a plurality of previous input data of the genuine person, matching scores of said plurality of previous input data being higher than or equal to a predefined matching threshold.

13. The authentication apparatus of claim 2, wherein said forgery difficulty calculator calculates the forgery difficulty of biometric data of the genuine person on the basis of the matching determination threshold.

14. The authentication apparatus of claim 2, wherein said forgery difficulty calculator calculates the forgery difficulty of biometric data of the genuine person on the basis of the calculated matching score.

15. The authentication apparatus of claim 1, wherein said biometric data is fingerprint data, and said forgery difficulty calculator calculates the forgery difficulty of biometric data of the genuine person on the basis of unsharpness of fingerprint ridges.

16. The authentication apparatus of claim 1, wherein said biometric data is fingerprint data, and said forgery difficulty calculator calculates the forgery difficulty of biometric data of the genuine person on the basis of state of finger skin.

17. An authentication method executed by an authentication apparatus for authenticating a person by determining whether input data belongs to a biologic object in accordance with a predefined condition based on biometric data of a genuine person and whether the input data matches with registered biometric data of the genuine person, said authentication method comprising:

extracting forgery data from the input data, said forgery data being for determining whether the input data belongs to a biologic object or a fake;

calculating forgery similarity of biometric data of the genuine person, said forgery similarity indicating similarity to a fake;

calculating forgery difficulty of biometric data of the genuine person, said forgery difficulty indicating difficulty of forgery;

determining a forgery determination threshold on the basis of the forgery similarity and the forgery difficulty;

calculating a forgery score of the input data on the basis of extracted forgery data, said forgery score indicating likelihood of forgery; and determining whether the input data belongs to a biologic object by comparing calculated forgery score with the forgery determination threshold.

18. A non-transitory computer-readable medium storing a program that causes a computer to execute an authentication method for authenticating a person by determining whether input data belongs to a biologic object in accordance with a predefined condition based on biometric data of a genuine person and whether the input data matches with registered biometric data of the genuine person, said authentication method comprising:

extracting forgery data from the input data, said forgery data being for determining whether the input data belongs to a biologic object or a fake;

calculating forgery similarity of biometric data of the genuine person, said forgery similarity indicating similarity to a fake;

calculating forgery difficulty of biometric data of the genuine person, said forgery difficulty indicating difficulty of forgery;

determining a forgery determination threshold on the basis of the forgery similarity and the forgery difficulty;

calculating a forgery score of the input data on the basis of extracted forgery data, said forgery score indicating likelihood of forgery; and determining whether the input data belongs to a biologic object by comparing calculated forgery score with the forgery determination threshold.

* * * * *